US008406192B2

(12) United States Patent
Cai et al.

(10) Patent No.: US 8,406,192 B2
(45) Date of Patent: Mar. 26, 2013

(54) HANDOVER MECHANISMS WITH SYNCHRONOUS PDCP PROTOCOL UNDER VARIOUS RELAY ARCHITECTURES

(75) Inventors: Zhijun Cai, Irving, TX (US); Rose Qingyang Hu, Irving, TX (US); Yi Yu, Irving, TX (US); Mo-Han Fong, Kanata (CA); Chandra S. Bontu, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 615 days.

(21) Appl. No.: 12/573,010

(22) Filed: Oct. 2, 2009

(65) Prior Publication Data

US 2011/0080890 A1 Apr. 7, 2011

(51) Int. Cl.
 *H04W 4/00* (2009.01)
 *H04J 1/10* (2006.01)
 *H04J 3/08* (2006.01)
 *H04B 7/14* (2006.01)

(52) U.S. Cl. .......................................... 370/331; 370/315

(58) Field of Classification Search .................. None
See application file for complete search history.

(56) References Cited

U.S. PATENT DOCUMENTS

| 2002/0078135 | A1  | 6/2002  | Venkatsubra |
| 2007/0072604 | A1  | 3/2007  | Wang |
| 2007/0079207 | A1* | 4/2007  | Seidel et al. .................. 714/748 |
| 2008/0112365 | A1  | 5/2008  | Kwun et al. |
| 2008/0273537 | A1  | 11/2008 | Meylan et al. |
| 2008/0307524 | A1* | 12/2008 | Singh et al. ...................... 726/22 |
| 2009/0168788 | A1  | 7/2009  | Den et al. |
| 2009/0196252 | A1  | 8/2009  | Fischer |
| 2010/0322197 | A1* | 12/2010 | Adjakple et al. .............. 370/332 |
| 2011/0002304 | A1* | 1/2011  | Lee et al. ....................... 370/331 |
| 2012/0142357 | A1  | 6/2012  | Aminaka |

FOREIGN PATENT DOCUMENTS

| EP | 0986222 A2    | 3/2000  |
| EP | 1422883 A1    | 5/2004  |
| EP | 1519519 A1    | 3/2005  |
| WO | 2006090269 A1 | 8/2006  |
| WO | 2006138046 A2 | 12/2006 |
| WO | 2007092617 A2 | 8/2007  |

OTHER PUBLICATIONS

3GPP TSG-RAN WG2 #66 Tdoc R2-092953; San Francisco, USA, May 4-8, 2009; Source: Ericsson Title: Termination of the S1/X2 interfaces in relay node.*
Foreign Communication from Counterpart Application; Application No. 10184837.2-1249; EESR mailed Novemeber 30, 2010; 7 pgs.
Foreign Communication from Counterpart Application; Application No. 10184900.8-1249; EESR mailed Dec. 6, 2010; 7 pgs.
Foreign Communication from Counterpart Application; Application No. 10184508.9-1249; EESR mailed Dec. 6, 2010; 7 pgs.

(Continued)

*Primary Examiner* — Derrick Ferris
*Assistant Examiner* — Kodzovi Acolatse
(74) *Attorney, Agent, or Firm* — Conley Rose, P.C.; J. Robert Brown, Jr.

(57) ABSTRACT

A method is provided for handing over a user equipment (UE). The method includes a donor access node with which the UE is in communication via a relay node receiving UE handover context information. The method further includes the donor access node using the UE handover context information to identify data packets that belong to the UE and are to be forwarded from the donor access node to a target access node.

38 Claims, 20 Drawing Sheets

OTHER PUBLICATIONS

Cai, Zhijun, et al.; U.S. Appl. No. 12/573,015, filed Oct. 2, 2009; Title: Architecture for Termination at Access Device.

Cai, Zhijun, et al.; U.S. Appl. No. 12/573,014, filed Oct. 2, 2009; Title: System and Method for Handover Between Relays.

3GPP TS 36.331v9.0.0; 3rd Generation Partnership Project; Technical Specification Group Radio Access Network; Evolved Universal Terrestrial Radio Access (E-UTRA) Radio Resource Control (RRC); Protocol Specification; Release 9; Sep. 2009; 213 pgs.

3GPP TR 36.912v0.2.0; 3rd Generation Partnership Project; Technical Specification Group Radio Access Network; Feasibility Study for Further Advancements for E-UTRA (LTE-Advanced); Release 9; Aug. 2009; 31 pgs.

3GPP TS 36.300v8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Mar. 2009; 157 pgs.

3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.

NTT Docomo, Inc.; Title: Report of email discussion [66#22] on Relay Architecture; R2-093972; 3GPP TSG-RAN WG2 #66bis; Los Angeles, USA; Jun. 29-Jul. 3, 2009; 30 pgs.

Ericsson; Title: Termination of the S1/X2 Interfaces in Relay Node; R2-092953; 3GPP TSG-RAN WG2 #66; San Francisco, USA; May 4-8, 2009; 4 pgs.

Motorola; Title: Handovers Involving Type-1 Relay Node; R2-093207; 3GPP TSG-RAN-WG2 Meeting #66; San Francisco, USA; May 4-8, 2009; 2 pgs.

NTT Docomo; Title: Relay Requirements & Use Case Study in LTE-Advanced; R2-093281; 3GPP TSG-RAN2#66; San Francisco, USA; May 4-8, 2009; 5 pgs.

NTT Docomo, Inc.; Title: on S1 Termination and Protocol Stack in Relay Architecture; R2-093283; 3GPP TSG-RAN2#66; San Francisco, USA; May 4-8, 2009; 8 pgs.

Qualcomm Europe; Title: Operation of Relays in LTE-A; R1-083191; 3GPP TSG-RAN WG1 #54; Jeju, S. Korea; Aug. 18-22, 2008; 5 pgs.

Motorola; Title: Classification of Relays; R1-083223; TSG-RAN WG1 #54; Jeju, South Korea; Aug. 18-22, 2008; 3 pgs.

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.

NTT Docomo; 3GPP TSG-RAN3 #64; Title: "Relay Requirements & Use Case Study in LTE-Advanced;" R3-091228; San Francisco, USA; May 4-8, 2009; 5 pgs.

Panasonic; 3GPP TSG RAN WG1 meeting #54; Title: "Discussion on the Various Types of Relays;" R1-082397; Warsaw, Poland; Jun. 30-Jul. 4, 2008; 6 pgs.

PCT International Search Report; PCT Application No. PCT/US2010/039236; mailed Aug. 26, 2010; 3 pgs.

PCT Written Opinion of the International Searching Authority; PCT Application No. PCT/US2010/039236; mailed Aug. 26, 2010; 6 pgs.

PCT Written Opinion of the International Searching Authority; PCT Application No. PCT/US2010/039236; mailed Aug. 25, 2010; 3 pgs.

PCT Written Opinion of the International Searching Authority; PCT/US2010/039257; mailed Aug. 25, 2010; 4 pgs.

RAN3 LTE-A Rapporteur; 3GPP TSG RAN WG3 Meeting #64; Title: "LTE-A RAN3 Baseline Document;" R3-091447; San Francisco, USA; May 4-8, 2009; 12 pgs.

Texas Instruments; 3GPP TSG RAN WG2 #66; Title: "On the Design of Relay Node for LTE-Advanced;" R2-093064; San Francisco, USA; May 4-8, 2009; 4 pgs.

Hu, Rose Qingwang, et al.; U.S. Appl. No. 12/819,138; Title "Mechanisms for Data Handling During a Relay Handover with S1 Termination at Relay"; filed Jun. 18, 2010.

Hu, Rose Qingyang, et al.; U.S. Appl. No. 12/819,139; Title "Mechanisms for Data Handling During a Relay Handover with S1 Termination at Evolved Universal Terrestrial Radio Access Network Access Node"; filed Jun. 18, 2010.

Office Action dated Oct. 1, 2012; U.S. Appl. No. 12/819,138, filed Jun. 18, 2010; 25 pages.

Office Action dated Aug. 9, 2012; U.S. Appl. No. 12/819,139, filed Jun. 18, 2010; 29 pages.

Office Action dated Aug. 22, 2012; U.S. Appl. No. 12/573,015, filed Oct. 2, 2009; 28 pages.

European Examination Report; Application No. 10732550.8; Oct. 26, 2012; 3 pages.

Office Action dated Jun. 29, 2012; U.S. Appl. No. 12/573,014, filed Oct. 2, 2009; 34 pages.

Final Office Action dated Jan. 4, 2013; U.S. Appl. No. 12/819,139, filed Jun. 18, 2010; 12 pages.

* cited by examiner

HANDOVER MECHANISMS WITH SYNCHRONOUS PDCP PROTOCOL UNDER VARIOUS RELAY ARCHITECTURES

BACKGROUND

As used herein, the terms "user equipment" and "UE" can refer to wireless devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar wireless capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long Term Evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of a wireless network, such as a traditional base station, a wireless access point, or an LTE or LTE-A eNB, that creates a geographical area of reception and transmission coverage allowing a UE or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or a relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

These systems can include protocols such as a Radio Resource Control (RRC) protocol, which is responsible for the assignment, configuration, and release of radio resources between a UE and a network node or other equipment. The RRC protocol is described in detail in the Third Generation Partnership Project (3GPP) Technical Specification (TS) 36.331.

The signals that carry data between UEs, relay nodes, and access nodes can have frequency, time, space, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UE or network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure deals with wireless telecommunications systems in which a communication path known as the S1 path terminates at a relay node. Mechanisms are provided whereby a UE can be handed over from such a relay node to an access node that may be in the same cell as the relay node or in a different cell. Handover mechanisms are provided for three different relay node/access node architectures.

Figure 1:
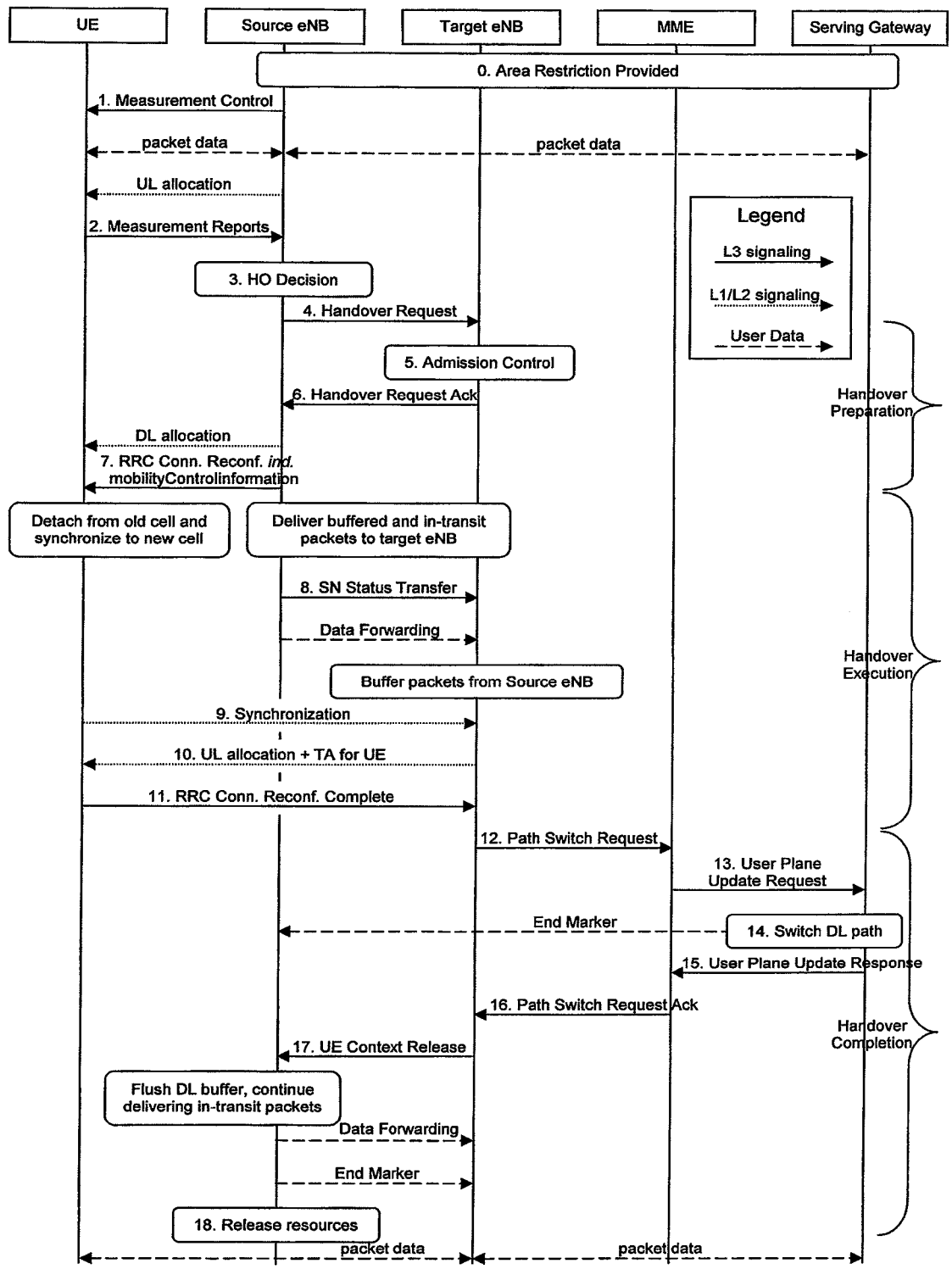
FIG. 1 is a diagram illustrating a handover from one access node to another access node under the prior art.

As a UE moves, it may be handed over from one access node to another access node. FIG. 1 illustrates a procedure defined in 3GPP TS 36.300 for a handover from one access node to another when no relay nodes are present.

Figure 2:
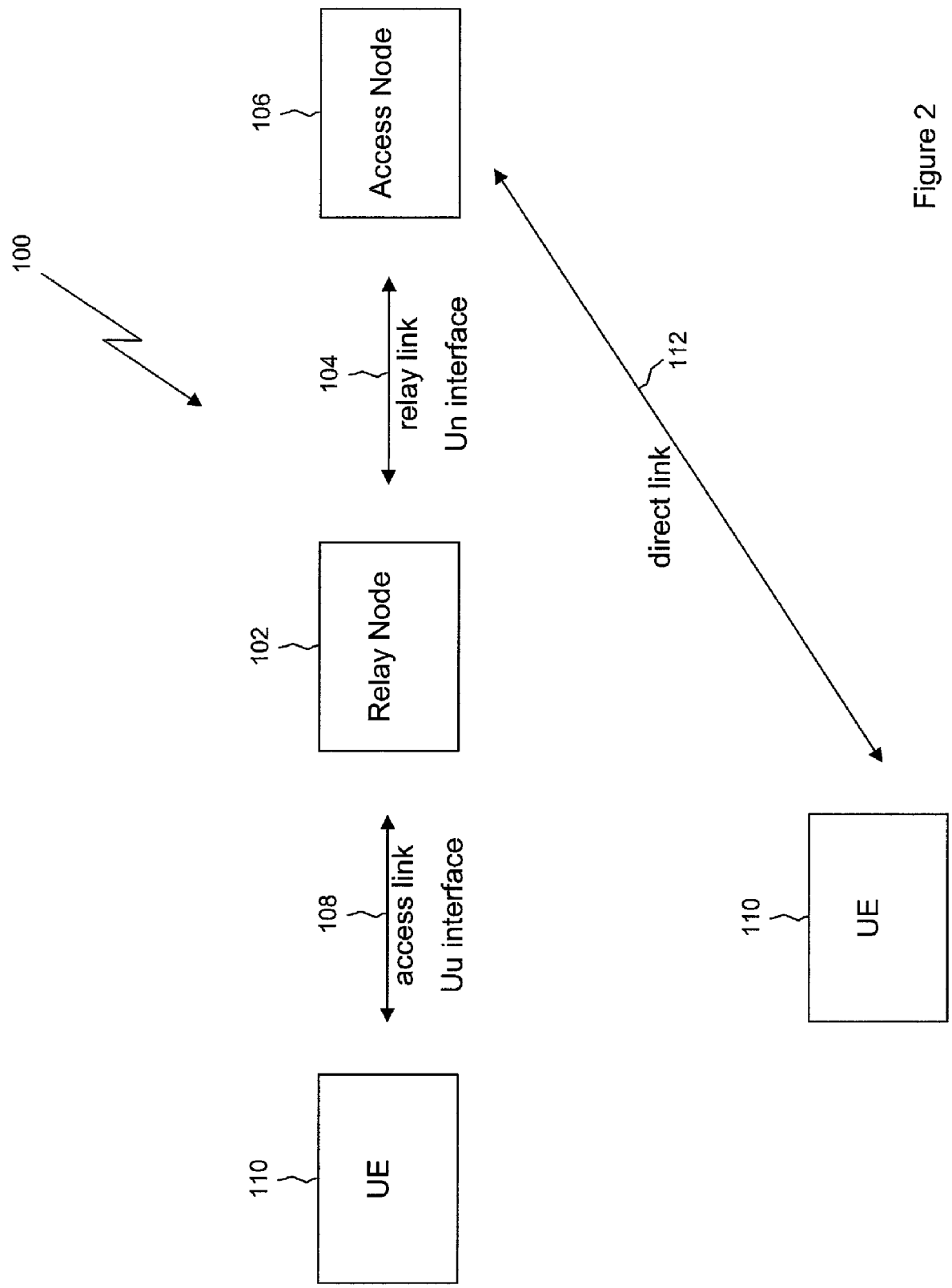
FIG. 2 is a diagram illustrating a wireless communication system that includes a relay node, according to an embodiment of the disclosure.

FIG. 2 is a diagram illustrating a wireless communication system 100 in which embodiments of the present disclosure may be implemented. Examples of the wireless communication system 100 include LTE or LTE-A networks, and all of the disclosed and claimed embodiments could be implemented in an LTE-A network. A relay node 102 can receive a signal from a UE 110 and transmit the signal to an access node 106. In some implementations of the relay node 102, the relay node 102 receives a signal with data from the UE 110 and then generates a new signal to transmit the data to the access node 106. The relay node 102 can also receive data from the access node 106 and deliver the data to the UE 110.

The relay node 102 might be placed near the edges of a cell so that the UE 110 can communicate with the relay node 102 rather than communicating directly with the access node 106 for that cell. In radio systems, a cell is a geographical area of reception and transmission coverage. Cells can overlap with each other. In a typical situation, one access node is associated with each cell. The size of a cell is determined by factors such as frequency band, power level, and channel conditions. One or more relay nodes, such as relay node 102, can be used to enhance coverage within a cell or to extend the size of coverage of a cell. Additionally, the use of a relay node 102 can enhance throughput of a signal within a cell because the UE 110 can access the relay node 102 at a higher data rate than the UE 110 might use when communicating directly with the access node 106 for that cell, thus creating higher spectral efficiency. The use of a relay node 102 can also decrease the UE's battery usage by allowing the UE 110 to transmit at a lower power.

When the UE 110 is communicating with the access node 106 via the relay node 102, the links that allow wireless communication can be said to be of three distinct types. The communication link between the UE 110 and the relay node 102 is said to occur over an access link 108, which can also be referred to as the Uu interface. The communication between the relay node 102 and the access node 106 is said to occur over a relay link 104, which can also be referred to as the Un interface or the backhaul link. Communication that passes directly between the UE 110 and the access node 106 without passing through the relay node 102 is said to occur over a direct link 112.

Relay nodes can be divided into three kinds: layer one relay nodes, layer two relay nodes, and layer three relay nodes. A layer one relay node is essentially a repeater that can retransmit a transmission without any modification other than amplification and possibly slight delay. A layer two relay node can demodulate/decode a transmission that it receives, re-modulate/re-encode the demodulated/decoded data, and then transmit the re-modulated/re-encoded data. A layer three relay node can have full radio resource control capabilities and can thus function similarly to an access node. The illustrative embodiments herein are primarily concerned with layer three relay nodes.

The radio resource control protocols used by a relay node may be the same as those used by an access node, and the relay node may have a unique cell identity. Relay nodes known as Type 1 relay nodes may have their own physical cell IDs and transmit their own synchronization signals and reference symbols. Relay nodes known as Type 2 relay nodes do not have separate cell IDs and thus would not create any new cells. That is, a Type 2 relay node does not transmit a physical ID that is different from the access node ID. A Type 2 relay node can relay signals to and from legacy (LTE Release 8) UEs, but Release 8 UEs are not aware of the presence of Type 2 relay nodes. A Type 2 relay node can also relay signals to and from LTE-A Release 10 and later UEs. LTE-A Release 10 and later UEs might be aware of the presence of a Type 2 relay node. As used herein, the term "Release 10" refers to any UE capable of following LTE standards later than LTE Release 8 or LTE Release 9, the term "Release 8" refers to any UE capable of following only the LTE standards of LTE Release 8, and the term "Release 9" refers to any UE capable of following the LTE standards of LTE Release 8 and Release 9.

Disclosed herein are methods and systems for supporting relay handover for a UE in communication with an access node via a relay node, where a path for tunneling data packets associated with the UE is terminated at the relay node. For instance, the path may be used for tunneling General Packet Radio Service (GPRS) Tunneling Protocol (GTP) packets from an Enhanced Packet Core (EPC) to the relay node. This path may be referred to as the S1 path, and a handover as described herein may include an S1 path switch as described below. Specifically, a relay handover may be performed under one of a plurality of UE mobility scenarios, where the UE may be reassigned from a relay node to another network node. Among the plurality of possible mobility scenarios, the most common might be a handover from a relay node to an access node in the same donor cell as the relay node, a handover from a relay node to an access node in a cell different from the donor cell in which the relay node is located, and a handover from one relay node to another relay node. The present disclosure deals with handovers from a relay node to an access node.

To improve the relay handover, one of a plurality of schemes that can be referred to as "smart forwarding" may be used. One such scheme might use synchronous Packet Data Convergence Protocol (PDCP) Sequence Numbers (SNs) for interfaces between the access node, the relay node, and the UE, and might include sending a PDCP status report from the relay node to the access node. Another relay handover scheme may include early S1 path switching using a proxy S1 termination point at the access node before S1 path switching and early termination of access node relay transmissions. Details of these smart forwarding schemes can be found in U.S. Provisional Patent Application No. 61/218,904, filed Jun. 19, 2009, by Rose Qingyang Hu, et al, entitled "Mechanism for Data Handling During a Relay Handover with S1 Termination at Relay", which is incorporated by reference herein as if reproduced in its entirety. In order to clarify the present disclosure, a brief summary of these schemes will now be provided.

Figure 3:
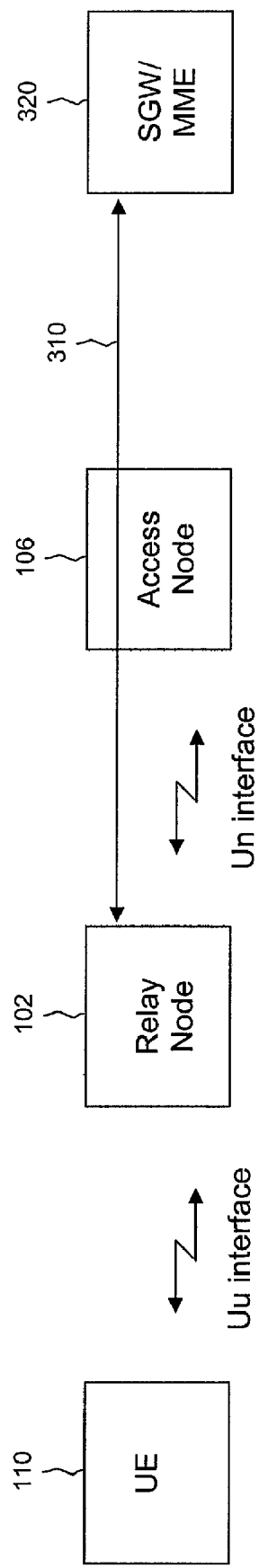
FIG. 3 is a diagram illustrating another wireless communication system that includes a relay node, according to an embodiment of the disclosure.

FIG. 3 illustrates an embodiment of an S1 path 310 terminated at the relay node 102. The S1 path 310 may be established between the relay node 102 and a serving gateway (SGW)/mobility management entity (MME) 320 or a similar component via the access node 106 (which may also be referred to as a donor eNB or DeNB). The SGW/MME 320 may allow the UE 110 to communicate with an external network. Data packets may be directed or tunneled between the SGW/MME 320 and the relay node 102, which may forward the packets to and from the UE 110 that is connected to the relay node 102.

Figure 4:
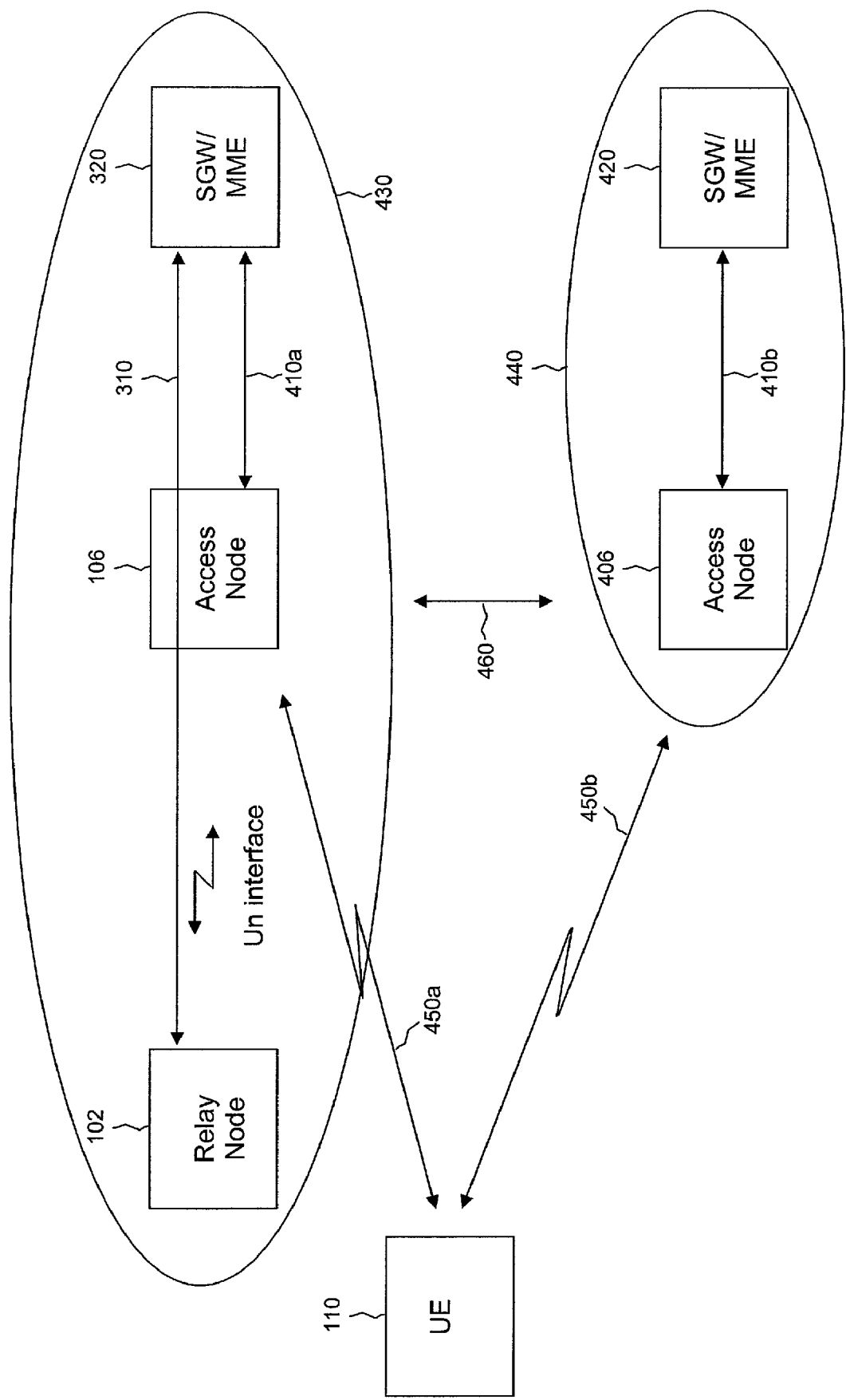
FIG. 4 is a diagram illustrating an S1 path switch, according to an embodiment of the disclosure.

If the UE 110 moves within a cell or from one cell to another cell, the UE 110 may need to be handed over from the relay node 102 to an access node. That is, an S1 path switch may be performed to establish a new S1 path terminated at an access node instead of at the relay node 102. This is illustrated in FIG. 4, where the UE 110 that has been in communication with the relay node 102 is being handed over to either the access node 106 in the same donor cell 430 as the relay node 102 or to an access node 406 in a different donor cell 440. The old S1 path 310 between the relay node 102 and the SGW/MME 320 is dropped, and a new S1 path 410a or 410b is established between the access node 106 and its associated SGW/MME 320 or between the access node 406 and its associated SGW/MME 420. The SGW/MME 320 and the SGW/MME 420 may or may not be the same entity. The UE 110 then communicates over wireless path 450a or 450b with one of the access nodes. The access nodes may communicate with one another over a path 460 known as the X2 interface.

During such a relay handover, a plurality of Packet Data Convergence Protocol (PDCP) service data units (SDUs) may be transmitted, for instance using a Radio Link Control (RLC) protocol, over the Un interface from the access node 106 to the relay node 102 and may be received by the relay node 102. In some cases, these packets may not have been transmitted to the UE 110 yet. In other cases, these packets may have been transmitted to the UE 110 but the relay node 102 may not have received an acknowledgment from the UE 110 yet on the transmitted packets. For example, at least some of the PDCP SDUs may not be completely transferred to the UE 110, such as in RLC-Unacknowledged Mode (RLC-UM), or may not be completely acknowledged by the UE 110, such as in RLC-Acknowledged Mode (RLC-AM).

To avoid data loss or call drops, the relay node 102 may return such PDCP SDUs to the access node 106 over the Un interface, for instance via an X2 interface protocol. The redirecting of the PDCP SDUs causes additional or redundant data forwarding during relay handover. Further more, when the access node 106 is configured and ready for the handover procedure, some of the PDCP SDUs may continue to be sent on the old S1 path 310 to the relay node 102 before the S1 path switch is completed. This results in convoluted data forwarding during the handover. Further, in the absence of an X2 interface protocol, additional data forwarding and convoluted handling may take place, since the PDCP SDUs are returned from the relay node 102 to the SGW/MME 320 then to the access node 106 instead of to the access node 106 directly. Redundant data forwarding and convoluted handling may increase packet loss and interruption time.

As described in detail in U.S. Provisional Patent Application No. 61/218,904 cited above, the access node 106 may be configured to be aware of the PDCP SDUs and/or any data received by the UE 110, for instance using synchronous PDCP SNs and a PDCP status report. In a handover procedure under such a configuration, the access node 106 may send the data to the reassigned UE 110 without redundant data forwarding from the relay node 102. Additionally or alternatively, the access node 106 may be configured to handle the S1 path switch to avoid convoluted data handling. For instance, the access node 106 may perform early S1 path switching and/or behave as a proxy S1 termination point before S1 path switching. The access node 106 may also ask the SGW/PGW 320 to perform early termination for data forwarding to the relay node 102.

The present disclosure provides embodiments of handover mechanisms when such synchronous PDCP protocols are used to perform smart forwarding under three different relay node/access node architectures. In all three architectures, the S1 interface terminates at a relay node. In a first architecture, the relay node 102 is a full, layer three relay that is transparent to the access node 106. In a second architecture, the access node 106 acts as a proxy S1/X2 interface, and the relay node 102 appears to the SGW/MME 320 to be a cell under the access node 106. In a third architecture, relay node bearers terminate at the access node 106.

Figure 5:
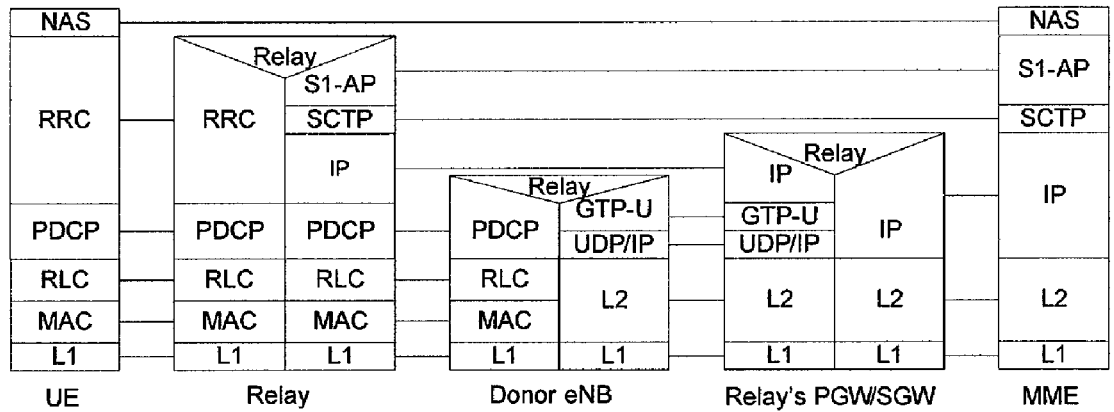
FIG. 5 is a diagram illustrating a control plane for a first architecture, according to an embodiment of the disclosure.
Figure 6:
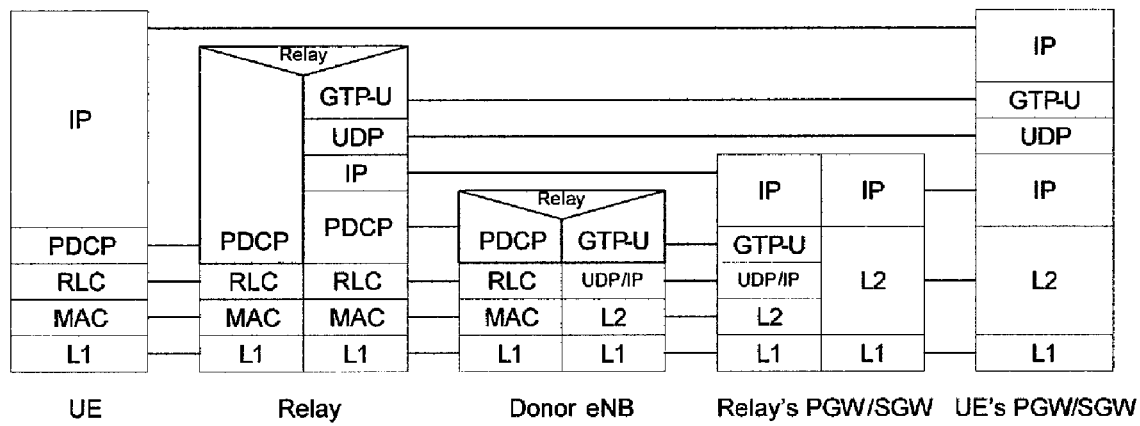
FIG. 6 is a diagram illustrating a user plane for a first architecture, according to an embodiment of the disclosure.

In the first architecture, both the user plane and control plane of the S1 interface are terminated at a relay node. The user plane packets of a UE served by the relay node are delivered via the relay node's packet data network gateway (PGW)/SGW and the relay node's radio bearers. From the UE's perspective, the relay node is the serving access node of the UE. The UE's PGW/SGW maps the incoming internet protocol (IP) packets to the GTP tunnels corresponding to the evolved packet system (EPS) bearer of the UE and tunnels the packets to the IP address of the relay node. The tunneled packets are routed to the relay node via the relay node's PGW/SGW. EPS bearers of different UEs connected to the relay node with similar quality of service (QoS) are mapped in one relay radio bearer over the Un interface. The control plane and user plane for this architecture are illustrated in FIGS. 5 and 6, respectively.

Figure 7:
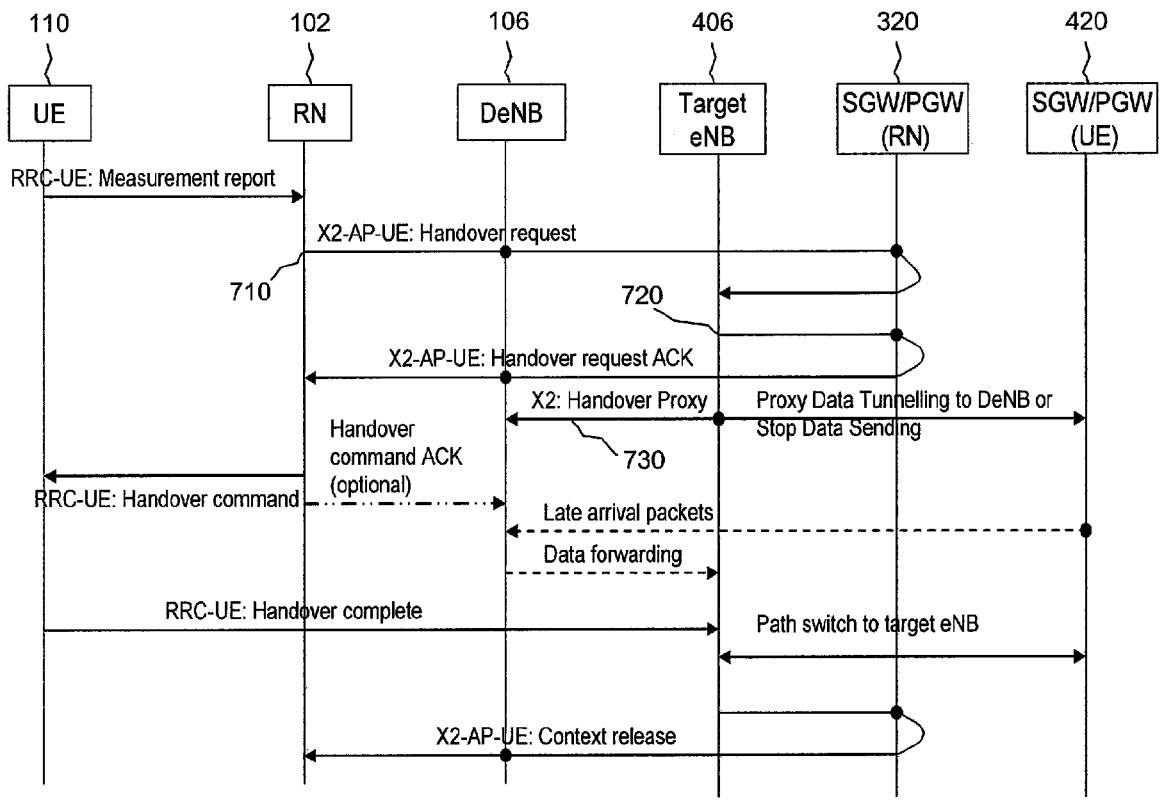
FIG. 7 is a diagram illustrating a handover procedure from a relay node to an access node in a first architecture, according to an embodiment of the disclosure.

FIG. 7 illustrates an embodiment of a procedure under the first architecture for a synchronous PDCP protocol during a relay mobility scenario in which the UE 110 is moving from the relay node 102 to an access node other than the access node 106 with which the relay node 102 communicates. For example, the UE 110 might be handed over to the access node 406 of FIG. 4. For the relay mobility scenario in which the UE 110 is moving from the relay node 102 to its donor access node, all the embodiments described here similarly apply. At event 710, the relay node (RN) 102 sends a Handover request message to the target access node (referred to here as the target eNB 406) via the donor access node (referred to here as the donor eNB or DeNB 106) and via the RN's SGW/PGW 320. The Handover request message contains UE context information, which at least includes UE identification information, radio bearer information, and traffic QoS information. In order to support smart forwarding based on synchronous PDCP, in some embodiments, the UE context information includes an RN cell global identifier (CGI), a DeNB CGI, security context information, one or more UE bearer GTP tunnel endpoint identifiers (TEIDs), and RN radio bearer configuration information that carries the corresponding UE's GTP tunneling. In other embodiments, the UE context information includes all of this information except for the RN radio bearer information. In another embodiment, the RN cell global identifier (CGI) and/or the DeNB identifier and/or the security context information and/or one or more UE bearer GTP tunnel endpoint identifiers (TEIDs) and/or the RN radio bearer configuration information that carries the corresponding UE's GTP tunneling may be contained in an information container other than the UE context information. For example, this information could be included in a new information container that can be referred to as UE handover context information. For simplicity, the term "UE context information" is used as an example here.

The DeNB 106 may need to be notified of the handover and the context of the handover. In one embodiment, after sending a Handover request acknowledgement message (ACK) to the RN 102, as shown at event 720, the target eNB 406 sends an X2-based Handover Proxy message to the DeNB 106, as shown at event 730. The Handover Proxy message includes the UE context information, that is, the RN CGI, the DeNB CGI, one or more UE bearer GTP tunneling TEIDs, and, optionally, the configuration of one or more RN radio bearers that carry the corresponding UE's GTP tunneling.

Figure 8:
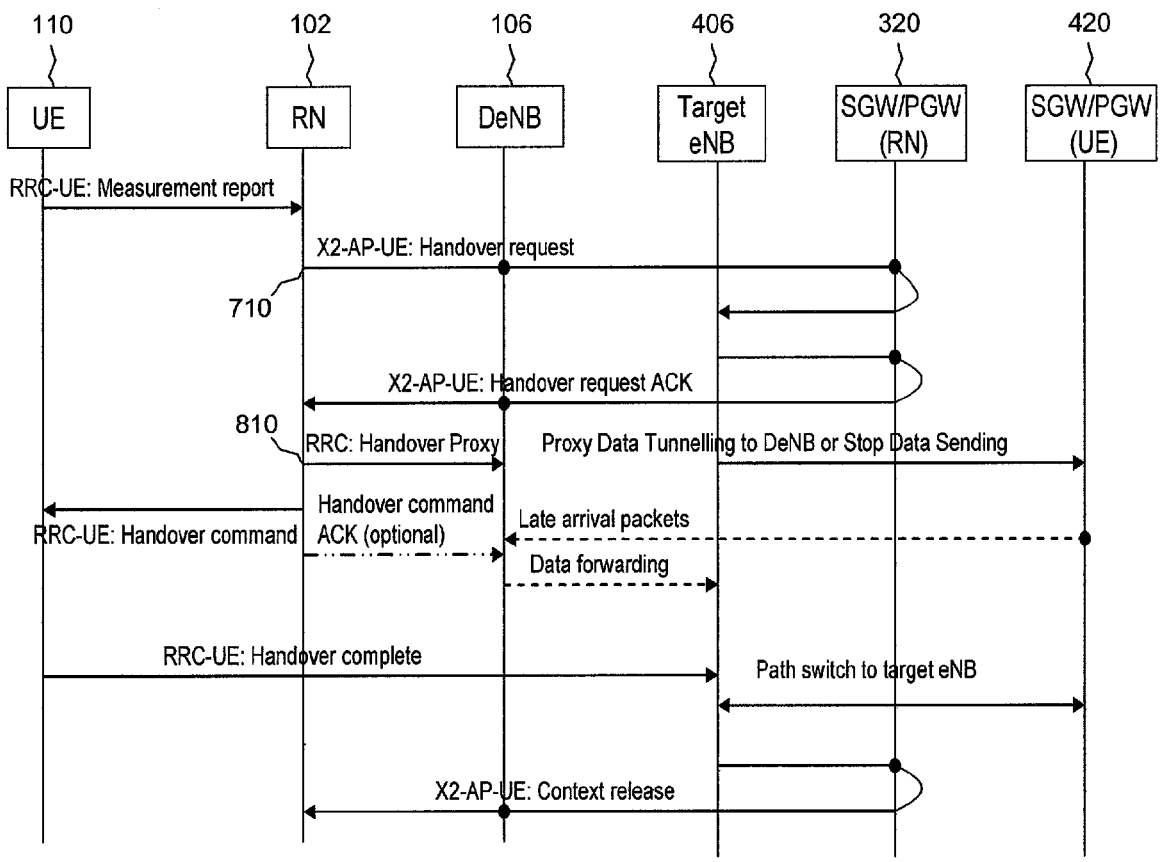
FIG. 8 is a diagram illustrating another handover procedure from a relay node to an access node in a first architecture, according to an embodiment of the disclosure.

FIG. 8 illustrates a call flow for another embodiment of a handover mechanism under the first architecture. In this embodiment, after the RN 102 sends the Handover request message at event 710, the RN 102, at event 810, sends an RRC-based Handover Proxy message to the DeNB 106. The UE context information described above is carried in the RRC-based Handover Proxy message and need not be carried in the Handover request message as described with regard to event 710 in FIG. 7.

Figure 9:
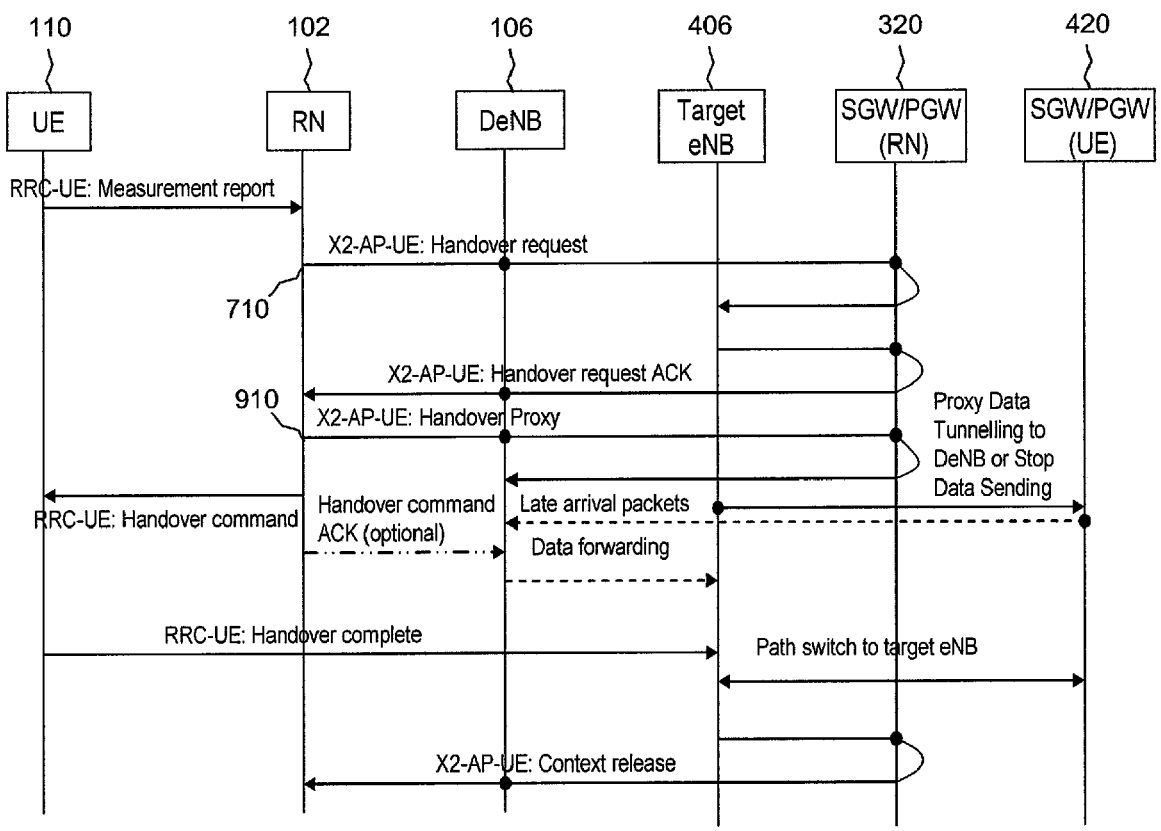
FIG. 9 is a diagram illustrating another handover procedure from a relay node to an access node in a first architecture, according to an embodiment of the disclosure.

FIG. 9 illustrates a call flow for yet another embodiment of a handover mechanism under the first architecture. In this embodiment, after the RN 102 sends the Handover request message at event 710, the RN 102, at event 910, sends an X2-based Handover Proxy message to the DeNB 106. The UE context information described above is carried in the Handover Proxy message and need not be carried in the Handover request message as described with regard to event 710 in FIG. 7.

With the UE context information that is included in the Handover request message (as in FIG. 7), in the RRC-based Handover Proxy message (as in FIG. 8), or in the X2-based Handover Proxy message (as in FIG. 9), the DeNB 106 is able to identify the buffered packets that belong to the UE that initiated the handover and thus is able to perform smart forwarding. To do so, the DeNB 106 first identifies the flows that belong to the corresponding RN CGI. If the RN radio bearer context is included in the UE context information, the DeNB 106 then identifies the PDCP queue of the RN 102 to which the UE 110 belongs based on the RN radio bearer configuration context. The DeNB 106 then checks the GTP/UDP/IP headers or a subset of the GTP/UDP/IP headers of each packet in the PDCP buffer to identify the packets that belong to the UE that triggered the handover and thus need to be forwarded. If the RN radio bearer context is not included in the UE context information, the DeNB 106 performs a brute-force search inside all PDCP queues, based on the GTP/UDP/IP headers or a subset of the GTP/UDP/IP headers, to identify the packets that belong to the UE that triggered the handover and thus need to be forwarded.

Figure 10:
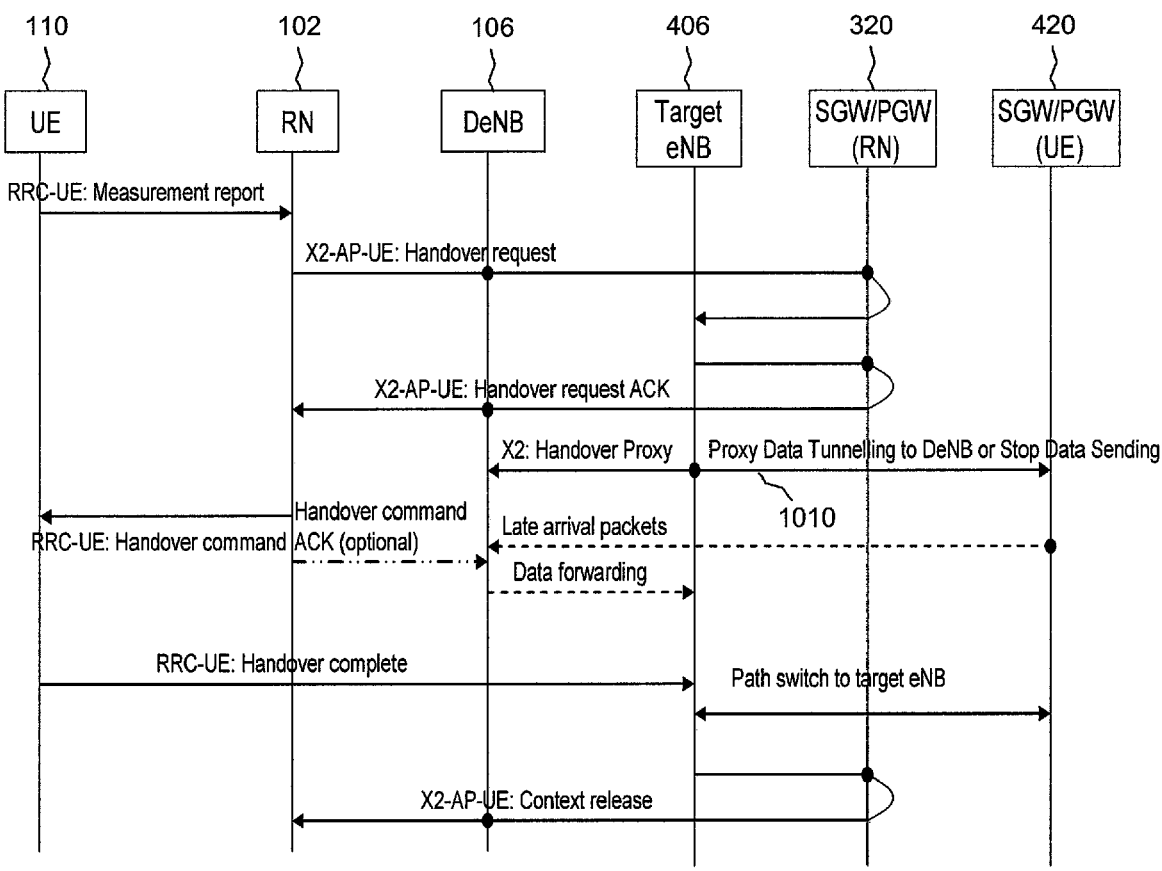
FIG. 10 is a diagram illustrating another handover procedure from a relay node to an access node in a first architecture, according to an embodiment of the disclosure.

In order to further reduce convoluted data forwarding for late arrivals, one or more additional procedures may be followed. FIG. 10 illustrates an embodiment of such a procedure when the UE context information is included in the Handover request, as in FIG. 7. At event 1010, the target eNB 406 sends a Proxy Data Tunneling message to the SGW/PGW (UE) 420 so that the SGW/PGW (UE) 420 will send all the data to the DeNB 106 as a proxy S1 termination. For example, this could happen after step 5 in the basic handover procedure of FIG. 1. The downlink UE packets are mapped to the UE bearer at the SGW/PGW (UE) 420 and the packets are sent in the corresponding UE bearer GTP tunneling directly destined to the DeNB 106. Without this message, the late arriving packets would still be destined to the RN 102. Alternatively, the target eNB 406 can send a Stop Data Sending message to the SGW/PGW (UE) 420 so that no traffic will be sent to the RN 102. This is also illustrated at event 1010 in FIG. 10 and could also happen after step 5 in the basic handover procedure of FIG. 1.

Data transmission resumes after the SGW/PGW (UE) 420 receives the S1 path switch message from the target eNB 406. The IP packets addressed to the UE 110 are temporarily stored at the SGW/PGW (UE) 420. In some implementations, the Handover Proxy message may be delayed until a confirmation (through a layer 2 ACK from the UE 110 or a layer 3 acknowledgement message from the UE 110) is received for the RRC Reconfiguration message. For example, this could happen after step 7 in the basic handover procedure of FIG. 1.

Figure 11:
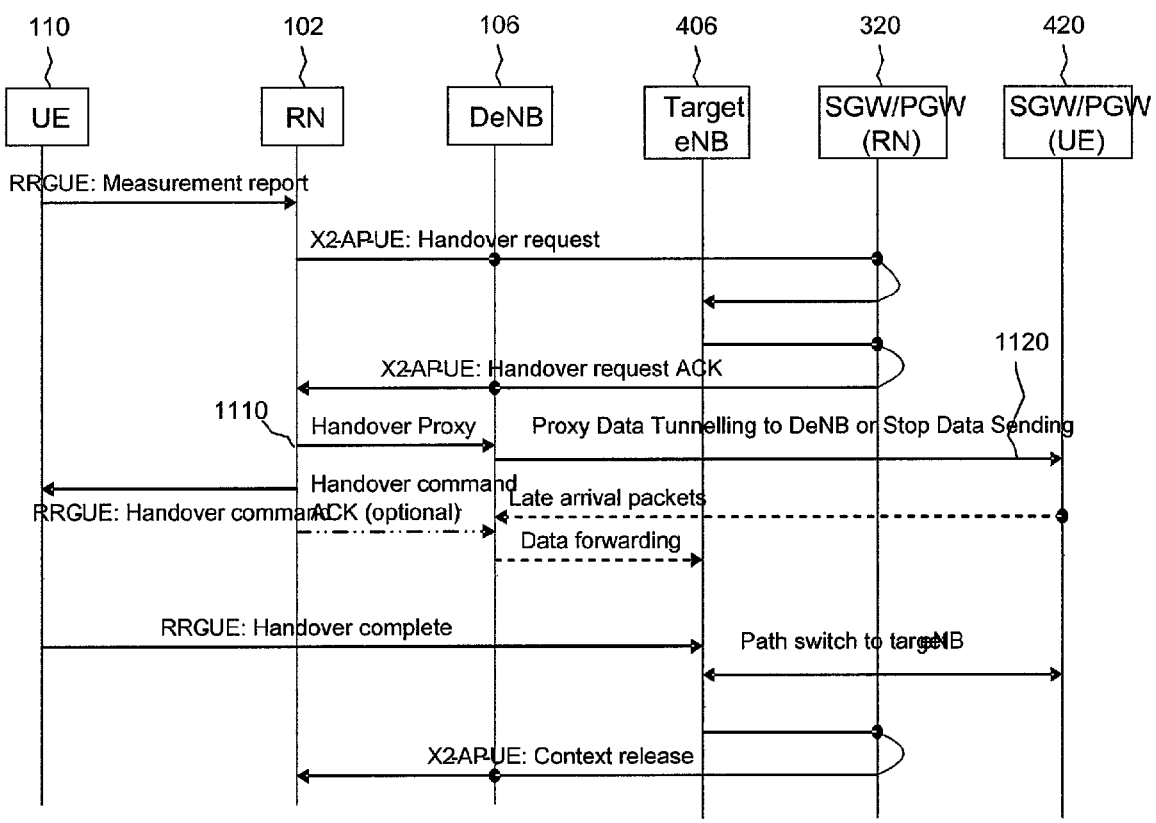
FIG. 11 is a diagram illustrating another handover procedure from a relay node to an access node in a first architecture, according to an embodiment of the disclosure.

FIG. 11 illustrates yet another procedure for reducing convoluted data forwarding for late arrivals. In this case, the UE context information is included in a Handover Proxy message sent from the relay node 102 to the DeNB 106, as in FIGS. 8 and 9. At event 1110, the DeNB 106 receives the RRC-based or X2-based Handover Proxy message. At event 1120, the DeNB 106 sends a Proxy Data Tunneling message to the SGW/PGW (UE) 420 so that the SGW/PGW (UE) 420 will send all the data to the DeNB 106 as a proxy S1 termination. Hence, no radio resources will be wasted over the Un interface for the extra forwarded data packets. Alternatively, the DeNB 106 might send a Stop Data Sending message at event 1120.

In a variation of this procedure, without sending a Proxy Data Tunneling message to the SGW/PGW (UE) 420, the DeNB 106 functions as a proxy and extracts the UE traffic out of the incoming flows after it receives the Handover Proxy message at event 1110. This may require the DeNB 106 to process all the packets that come in by reading the inner GTP tunneling header first (for an RN radio bearer) and then reading the outer GTP tunneling header afterwards (for a UE radio bearer).

In yet another procedure for reducing convoluted data forwarding for late arrivals, the target eNB 406 can send a path switch message to the SGW/PGW (UE) 420 and trigger an early path switch to the target eNB 406. For example, this could happen after step 5 in the basic handover procedure of FIG. 1.

The DeNB 106 considers all packets, including buffered packets and late arrivals, in order to perform the forwarding to the target eNB 406. Furthermore, in order for the DeNB 106 to do data forwarding to the target eNB 406 after the UE 110 receives a Handover command message, in one embodiment the RN 102 sends an RRC-based Handover Command ACK message to the DeNB 106. Only after receiving this message does the DeNB 106 start to do data forwarding to the target eNB 406.

In another embodiment, a retention timer could be used at the DeNB 106 to keep all the forwarded data in its buffer for some duration, which can either be fixed or configurable. This is useful when the UE 110 experiences a radio link failure and returns to the original node, in this case the RN 102. Data loss and handover delay is kept to a minimum in this way. The resource retention timer can be maintained at both the RN 102 and the DeNB 106. The DeNB 106 may need to signal the value of the retention timer to the RN 102 via high layer signaling such as RRC signaling. When the UE 110 returns to the RN 102 after a radio link failure occurs, the RN 102 can resume data transmission immediately if there are unsent or unacknowledged packets in the buffer. The RN 102 may send a high layer indication, such as RRC signaling, to the DeNB 106 to resume data forwarding to the RN 102.

Figure 12:
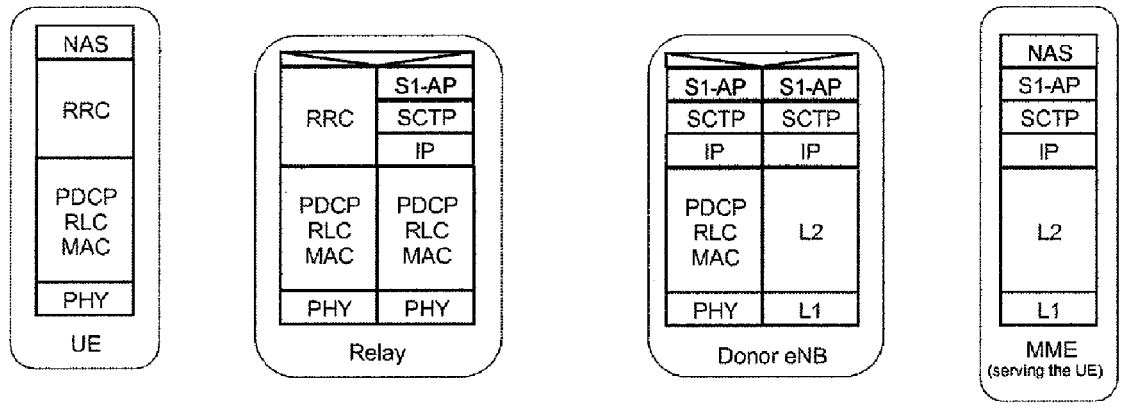
FIG. 12 is a diagram illustrating a control plane for a second architecture, according to an embodiment of the disclosure.
Figure 13:
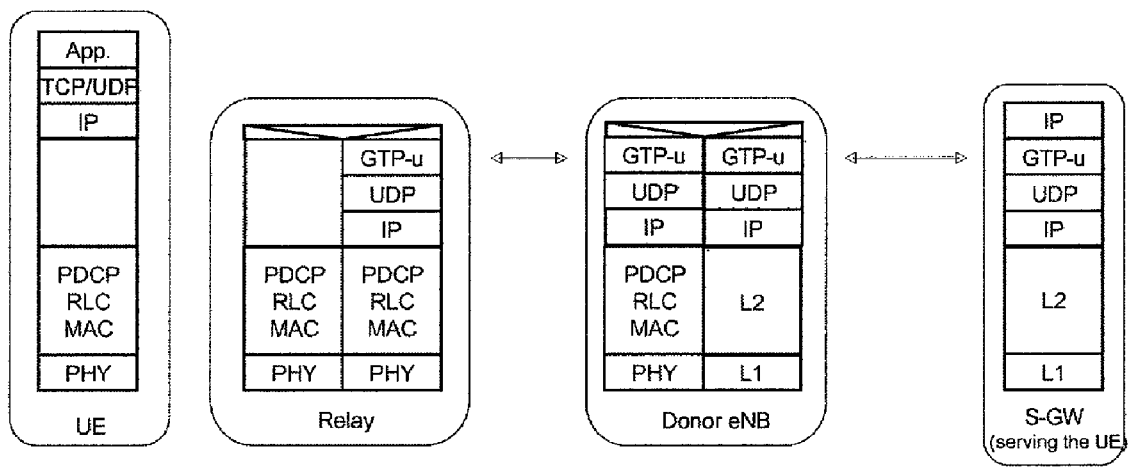
FIG. 13 is a diagram illustrating a user plane for a second architecture, according to an embodiment of the disclosure.

In the second architecture, the user plane of the S1 interface is terminated at the RN 102 and at the DeNB 106. The DeNB 106 acts as a proxy S1/X2 interface. The SGW 420 serving the UE 110 maps the incoming IP packets to the GTP tunnels corresponding to the EPS bearer of the UE 110 and sends the tunneled packets to the IP address of the DeNB 106. Upon the DeNB 106 receiving the tunneled packets from the SGW 420, the received packets are de-tunneled, and the user IP packets are mapped to the GTP tunnels again and sent to the IP address of the RN 102. EPS bearers of different UEs connected to the RN 102 with similar QoS are mapped in one radio bearer over the Un interface. The control plane and user plane for this architecture are illustrated in FIGS. 12 and 13, respectively.

Figure 14:
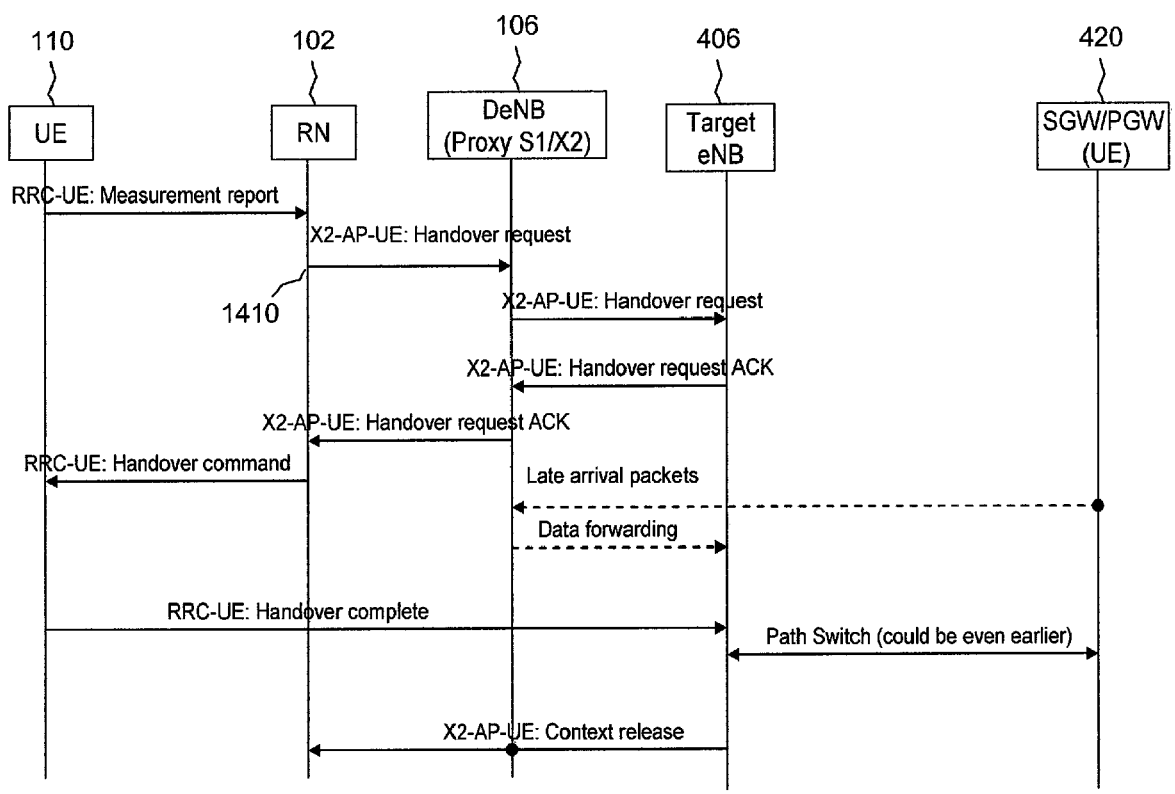
FIG. 14 is a diagram illustrating a handover procedure from a relay node to an access node in a second architecture, according to an embodiment of the disclosure.

An embodiment of a procedure for a synchronous PDCP protocol during a relay handover under this second architecture is illustrated in FIG. 14. At event 1410, the RN 102 sends a Handover request message to the DeNB 106. The Handover request message contains UE context information, which, besides the Release 8-defined UE context information, at least additionally includes the UE bearer GTP tunneling TEID, security context information, and the RN radio context. With the UE context information, the DeNB 106 is able to identify the buffered packets that belong to the UE that initiated the handover. To do so, the DeNB 106 first identifies the PDCP queue to which the UE 110 belongs based on the RN radio bearer configuration context. The DeNB 106 then checks the GTP/UDP/IP headers or a subset of the GTP/UDP/IP headers of each packet in the PDCP buffer to identify the packets that belong to the UE that triggered the handover. These packets are directly forwarded to the target eNB 406.

In the second architecture, the DeNB 106 has access to each UE radio bearer. To further reduce the DeNB's processing time and also to facilitate the per-UE radio bearer-based flow control, each UE bearer may have its own PDCP subqueue within the RN radio bearer level PDCP queue. The DeNB 106 can identify this PDCP subqueue based on the UE bearer TEID. All the packets in this subqueue are directly forwarded to the target eNB 406 without a need for a check of the GTP/UDP/IP headers or a subset of the GTP/UDP/IP headers one by one.

For late arriving packets, the DeNB 106 can access the UE bearers so that the DeNB 106 can directly forward these packets to the target eNB 406. For packets buffered at the RN 102 before the RN 102 receives the Handover request ACK, the RN 102 may send PDCP SN information in the synchronous PDCP status report to the DeNB 106, and the DeNB 106 may directly or indirectly forward those packets from its own buffer to the target eNB 406. With joint PDCP, there is no need for redundant data forwarding on the Un interface.

Figure 15:
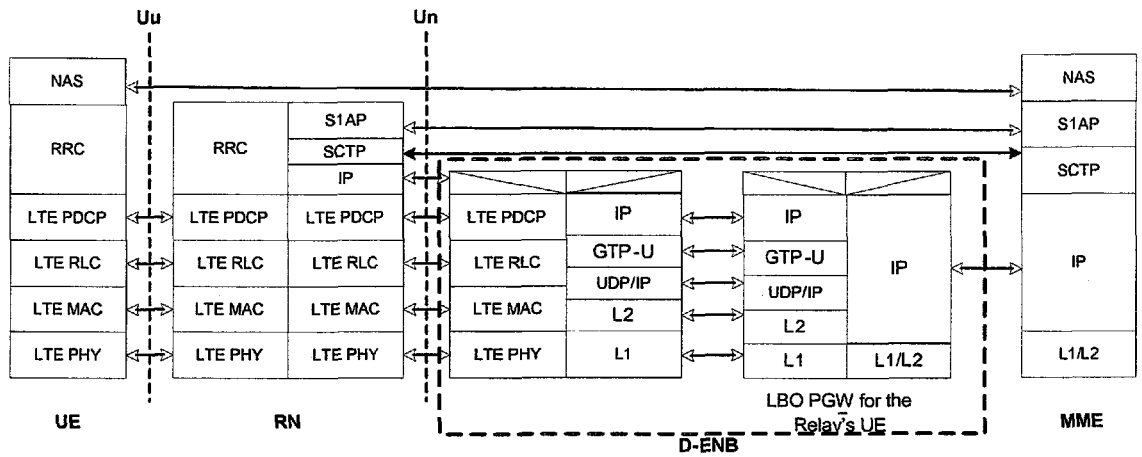
FIG. 15 is a diagram illustrating a control plane for a third architecture, according to an embodiment of the disclosure.
Figure 16:
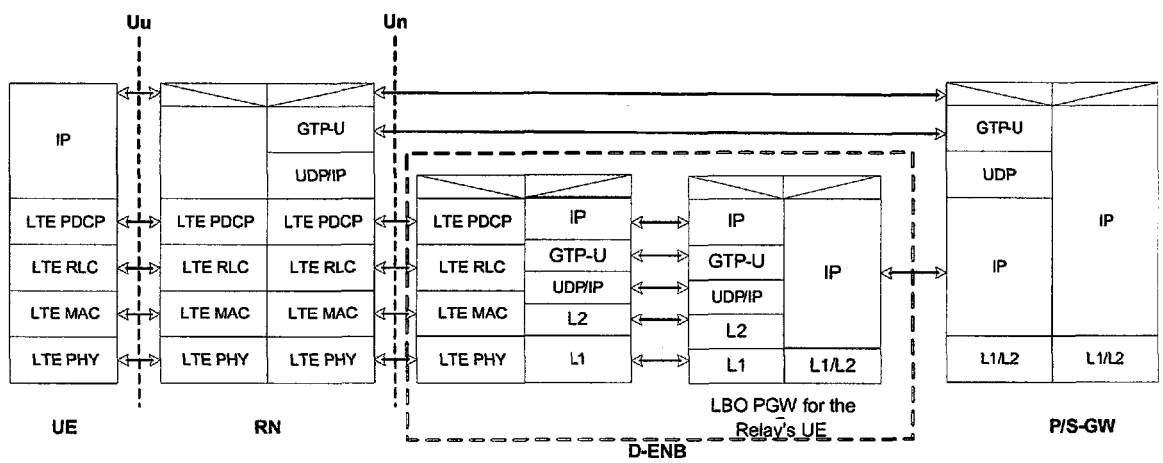
FIG. 16 is a diagram illustrating a user plane for a third architecture, according to an embodiment of the disclosure.

In the third architecture, the user plane of the S1 interface is terminated at the RN 102. The SGW 420 serving the UE 110 maps the incoming IP packets to the GTP tunnels corresponding to the EPS bearer of the UE 110 and sends the tunneled packets to the IP address of the RN 102. The DeNB 106 simply acts as an IP router and forwards GTP/UDP/IP packets between two interfaces. The DeNB 106 performs this router functionality via the PGW-like functionality in the DeNB 106. The DeNB 106 also performs other PGW-like functionality for the UE side of the RN 102, such as management of QoS. EPS bearers of different UEs connected to the RN 102 with similar QoS are mapped in one radio bearer over the Un interface. The control plane and user plane for this architecture are illustrated in FIGS. 15 and 16, respectively.

Figure 17:
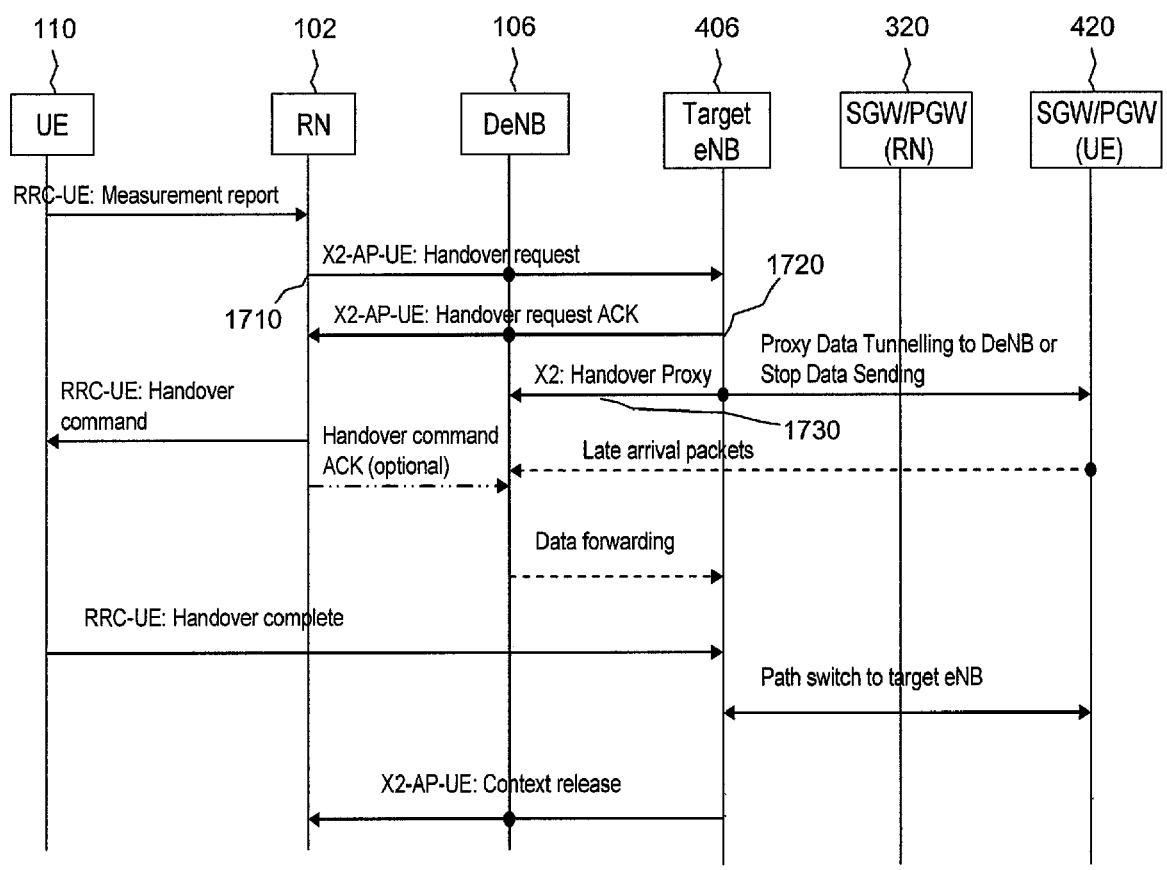
FIG. 17 is a diagram illustrating a handover procedure from a relay node to an access node in a third architecture, according to an embodiment of the disclosure.

FIG. 17 illustrates an embodiment of a procedure for a synchronous PDCP protocol during a relay handover under this third architecture. In this case, the RN 102 includes UE context information in a Handover request message sent to the target eNB 406, as shown at event 1710. The UE context information, besides the current context information defined in the Release 8 Handover Request Message, might additionally include the RN CGI, the DeNB CGI, the UE bearer GTP tunneling TEID, and the configuration of the RN radio bearer that carries the UE's GTP tunneling. Alternatively, the UE context information might not include the RN radio bearer information. After sending a Handover request ACK at event 1720, the target eNB 406, at event 1730, sends the DeNB 106 a handover proxy message that includes the UE context information. It can be seen that this scenario is similar to that illustrated in FIG. 7 for the first architecture, except that in this third architecture the Handover request from the RN 102 does not pass through the SGW/PGW (RN) 320.

Figure 18:
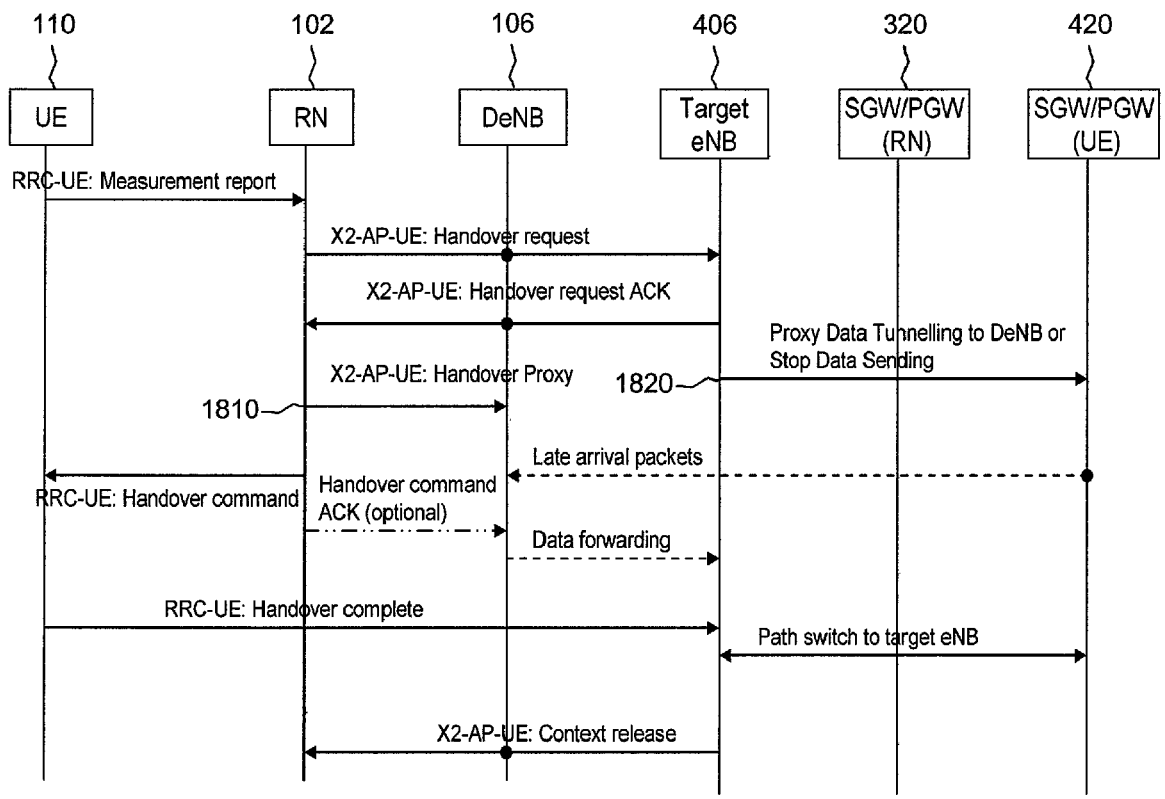
FIG. 18 is a diagram illustrating another handover procedure from a relay node to an access node in a third architecture, according to an embodiment of the disclosure.

Alternatively, as shown in FIG. 18, the UE context information might be included in an X2-based Handover Proxy message from the RN 102 to the DeNB 106, as shown at event 1810. The UE context information includes the RN CGI, the DeNB CGI, one or more UE bearer GTP tunneling TEIDs, and, optionally, the configuration of one or more RN radio bearers that correspond to the UE's GTP tunneling. It can be seen that this scenario is similar to that illustrated in FIG. 9, except that in this architecture the Handover request from the RN 102 to the target eNB 406 and the Handover Proxy message from the RN 102 to the DeNB 106 do not pass through the SGW/PGW (RN) 320.

Figure 19:
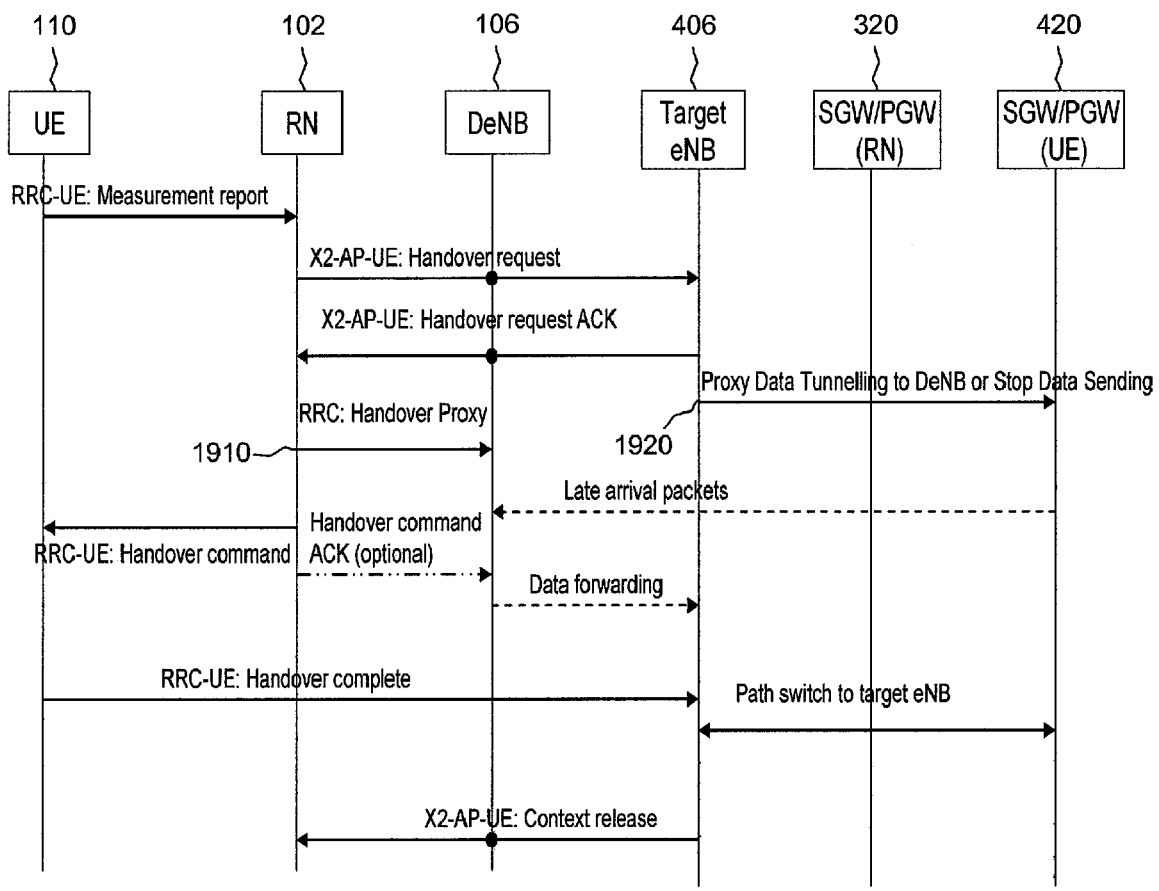
FIG. 19 is a diagram illustrating another handover procedure from a relay node to an access node in a third architecture, according to an embodiment of the disclosure.

In another alternative, as shown in FIG. 19, the UE context information is included in an RRC-based Handover Proxy message from the RN 102 to the DeNB 106, as shown at event 1910, and contains the same information as above. It can be seen that this scenario is similar to that illustrated in FIG. 8, except that in this architecture the Handover request from the RN 102 to the target eNB 406 does not pass through the SGW/PGW (RN) 320. In the embodiments of FIGS. 18 and 19, the UE context information is carried in an X2-based or RRC-based Handover Proxy message and need not be carried in the Handover request message as described with regard to FIG. 17.

Figure 20:
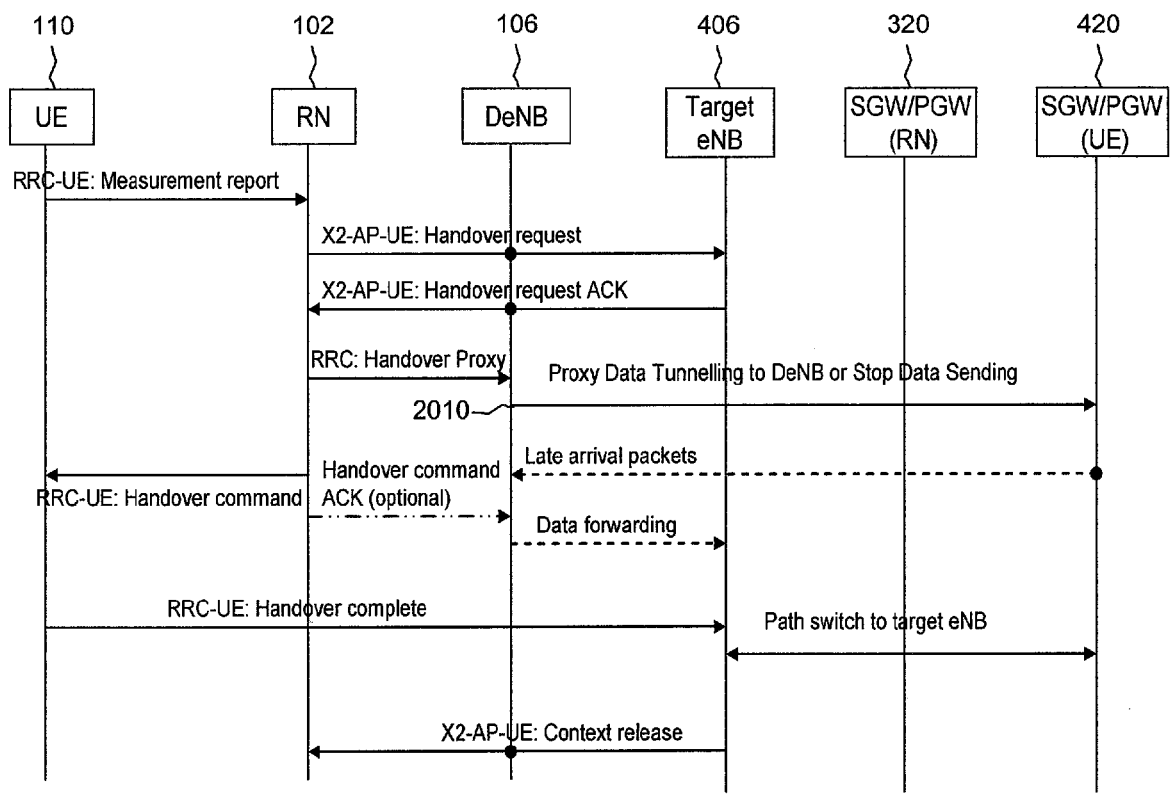
FIG. 20 is a diagram illustrating another handover procedure from a relay node to an access node in a third architecture, according to an embodiment of the disclosure.
Figure 21:
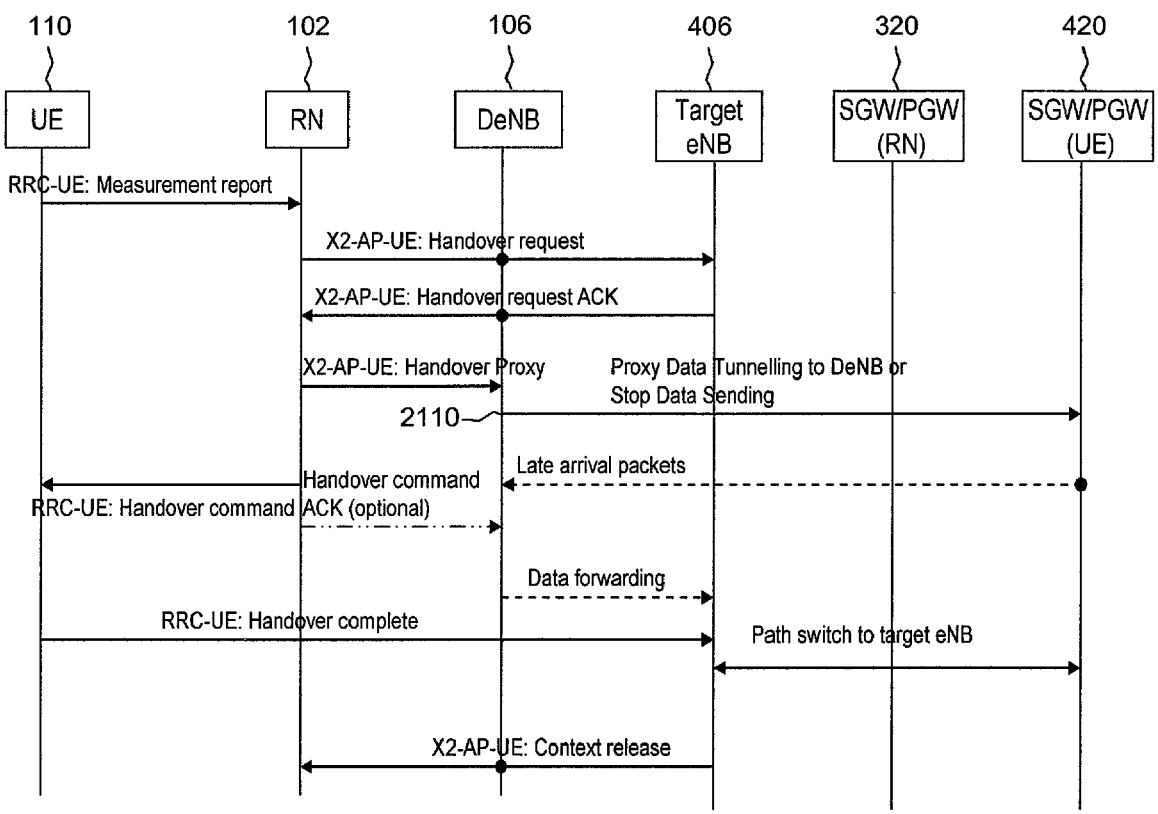
FIG. 21 is a diagram illustrating another handover procedure from a relay node to an access node in a third architecture, according to an embodiment of the disclosure.

In FIGS. 18 and 19, at events 1820 and 1920 respectively, the target eNB 406 sends a Proxy Data Tunneling message or a Stop Data Sending message to the SGW/PGW (UE) 420. In the alternatives shown in FIGS. 20 and 21, at events 2010 and 2110 respectively, the DeNB 106 sends the Proxy Data Tunneling message or the Stop Data Sending message to the SGW/PGW (UE) 420. These and the other additional procedures described above with regard to the first architecture for reducing convoluted data forwarding for late arrivals might be followed in this third architecture. Also, a retention tinier can be used at the DeNB 106 to buffer all the forwarded data for some duration, as described above with regard to the first architecture.

Figure 22:
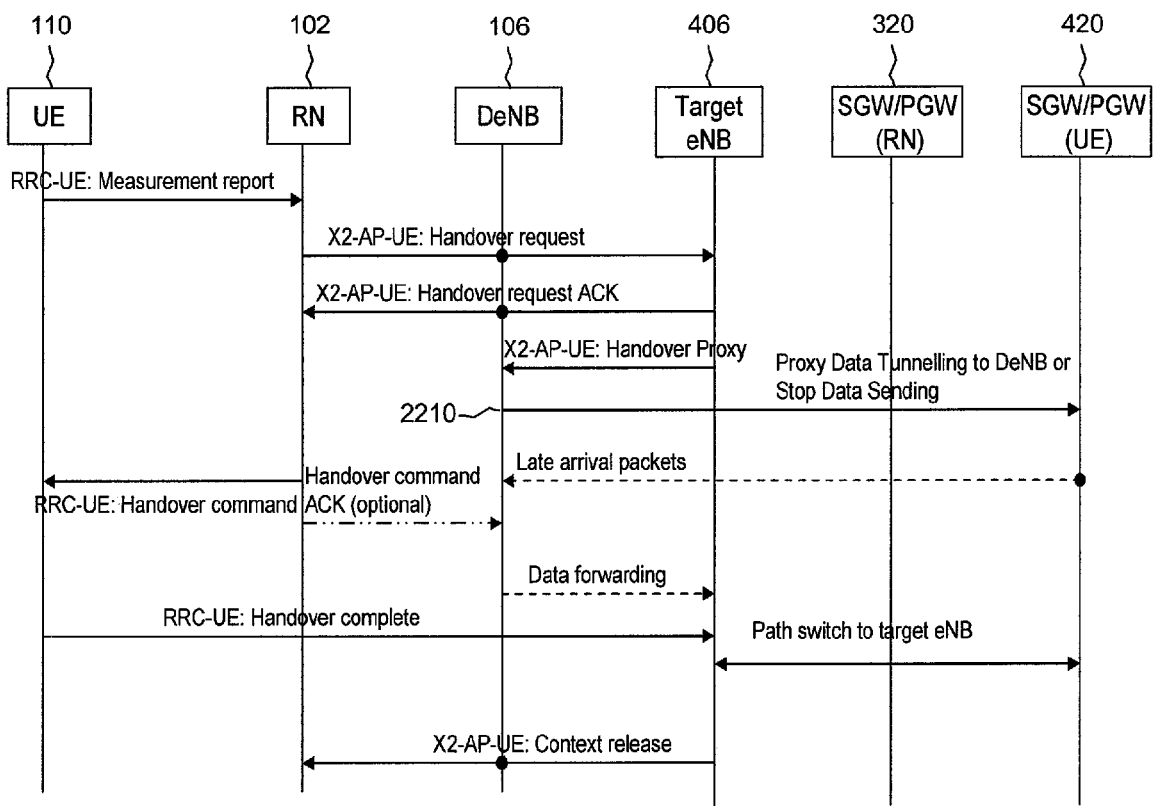
FIG. 22 is a diagram illustrating another handover procedure from a relay node to an access node in a third architecture, according to an embodiment of the disclosure.

In the alternative illustrated in FIG. 22, the UE context information is included in the Handover request message from the RN 102 to the target eNB 406, as in FIG. 17. In this case, however, rather than the target eNB 406 sending the Proxy Data Tunneling message or Stop Data Sending message to the SGW/PGW (UE) 420, the DeNB 106, at event 2210, sends the Proxy Data Tunneling message or Stop Data Sending message to the SGW/PGW (UE) 420.

In a variation of these alternatives, without sending a Proxy Data Tunneling message to the SGW/PGW (UE) 420, the DeNB 106 can function as a proxy and extract the UE traffic out of the incoming flows after it receives the Handover Proxy message. This may require the DeNB 106 to process all the late arrival packets that come in by reading the GTP tunneling header and identifying the packets that need to be forwarded.

With the UE context information in the Handover Proxy message (as in FIGS. 18, 19, 20, and 21) or in the Handover request message (as in FIGS. 17 and 22), the DeNB 106 is able to identify the buffered packets that belong to the UE that initiated the handover. To do so, the DeNB 106 first identifies the flows that belong to the RN CGI. If the RN radio bearer context is included in the UE context information, the DeNB 106 then identifies the PDCP queue of the RN 102 to which the UE 110 belongs based on the RN radio bearer configuration context. The DeNB 106 then checks the GTP/UDP/IP headers or a subset of the GTP/UDP/IP headers of each packet in the PDCP buffer to identify the packets that belong to the UE that triggered the handover. If the RN radio bearer context is not included in the UE context information, the DeNB 106 performs a brute-force search inside each PDCP queue, based on the GTP/UDP/IP headers or a subset of the GTP/UDP/IP headers, to identify the packets that belong to the UE that triggered the handover.

One of the differences between the first architecture and the third architecture is that for the first architecture, the RN radio bearer terminates at an RN GW, while for the third architecture, the RN radio bearer terminates at an eNB. This leads to different processing overhead at the DeNB 106 when the DeNB 106 performs data forwarding. In the first architecture, in the procedures for identifying the late arrivals, the DeNB 106 may need to read two GTP headers to recognize the packets. In the third architecture, in the procedures for identifying the late arrivals, the DeNB 106 only needs to read one GTP header to recognize the packets. The two architectures are otherwise similar.

Figure 23:
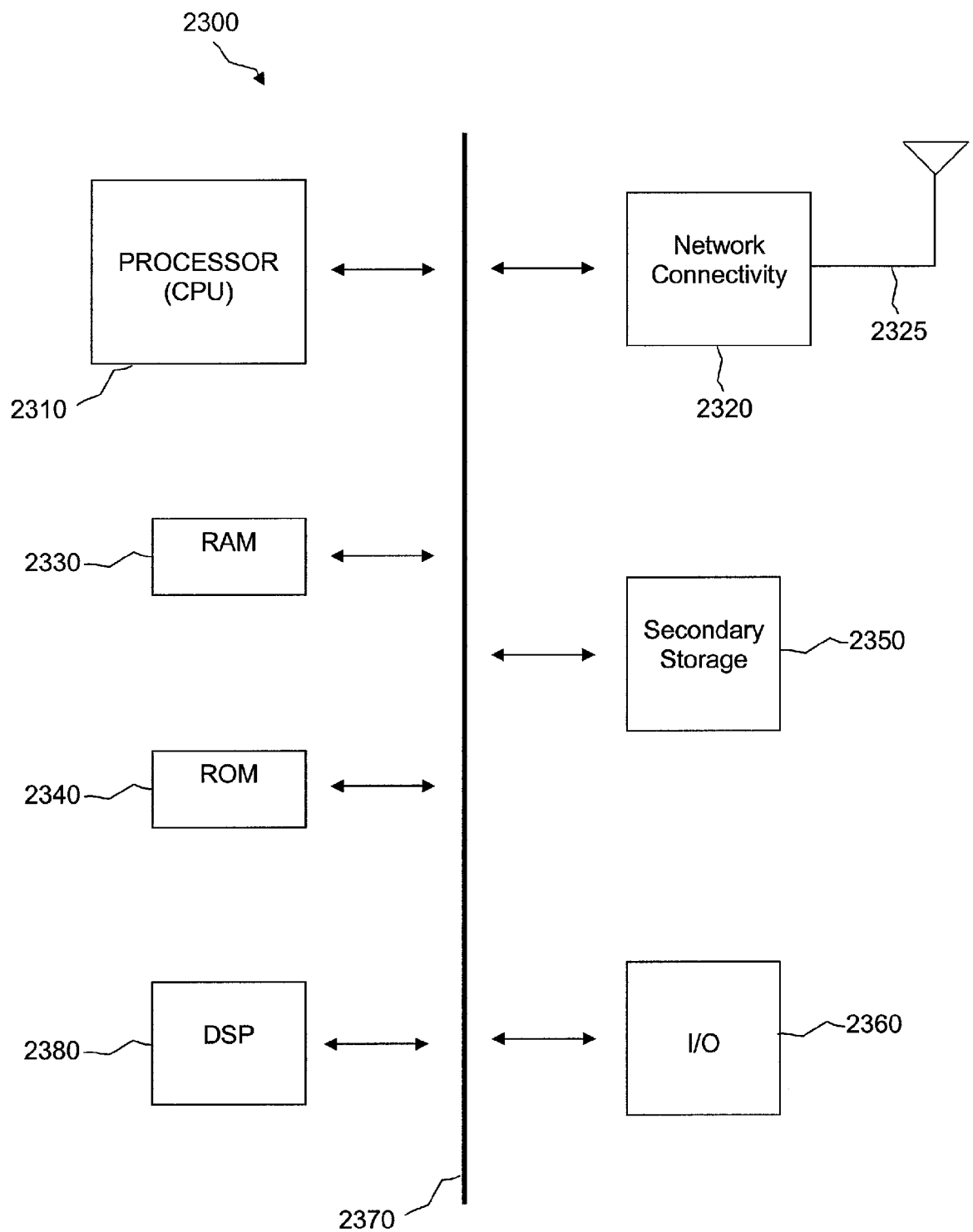
FIG. 23 illustrates a processor and related components suitable for implementing the several embodiments of the present disclosure.

The UA 110, the relay node 102, the access node 106, and other components described above might include a processing component that is capable of executing instructions related to the actions described above. FIG. 23 illustrates an example of a system 2300 that includes a processing component 2310 suitable for implementing one or more embodiments disclosed herein. In addition to the processor 2310 (which may be referred to as a central processor unit or CPU), the system 2300 might include network connectivity devices 2320, random access memory (RAM) 2330, read only memory (ROM) 2340, secondary storage 2350, and input/output (I/O) devices 2360. These components might communicate with one another via a bus 2370. In some cases, some of these components may not be present or may be combined in various combinations with one another or with other components not shown. These components might be located in a single physical entity or in more than one physical entity. Any actions described herein as being taken by the processor 2310 might be taken by the processor 2310 alone or by the processor 2310 in conjunction with one or more components shown or not shown in the drawing, such as a digital signal processor (DSP) 2380. Although the DSP 2380 is shown as a separate component, the DSP 2380 might be incorporated into the processor 2310.

The processor 2310 executes instructions, codes, computer programs, or scripts that it might access from the network connectivity devices 2320, RAM 2330, ROM 2340, or secondary storage 2350 (which might include various disk-based systems such as hard disk, floppy disk, or optical disk). While only one CPU 2310 is shown, multiple processors may be present. Thus, while instructions may be discussed as being executed by a processor, the instructions may be executed simultaneously, serially, or otherwise by one or multiple processors. The processor 2310 may be implemented as one or more CPU chips.

The network connectivity devices 2320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 2320 may enable the processor 2310 to communicate with the Internet or one or more telecommunications networks or other networks from which the processor 2310 might receive information or to which the processor 2310 might output information. The network connectivity devices 2320 might also include one or more transceiver components 2325 capable of transmitting and/or receiving data wirelessly.

The RAM 2330 might be used to store volatile data and perhaps to store instructions that are executed by the processor 2310. The ROM 2340 is a non-volatile memory device that typically has a smaller memory capacity than the memory capacity of the secondary storage 2350. ROM 2340 might be used to store instructions and perhaps data that are read during execution of the instructions. Access to both RAM 2330 and ROM 2340 is typically faster than to secondary storage 2350. The secondary storage 2350 is typically comprised of one or more disk drives or tape drives and might be used for non-volatile storage of data or as an over-flow data storage device if RAM 2330 is not large enough to hold all working data. Secondary storage 2350 may be used to store programs that are loaded into RAM 2330 when such programs are selected for execution.

The I/O devices 2360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 2325 might be considered to be a component of the I/O devices 2360 instead of or in addition to being a component of the network connectivity devices 2320.

The following are incorporated herein by reference for all purposes: 3GPP TS 36.300, 3GPP TS 36.331, 3GPP TS 36.814, and 3GPP TS 36.912.

In an embodiment, a method for handing over a user equipment (UE) is provided. The method includes a donor access node with which the UE is in communication via a relay node receiving UE handover context information and the donor access node using the UE handover context information to identify data packets that belong to the UE and are to be forwarded from the donor access node to a target access node.

In another embodiment, a donor access node is provided. The donor access node includes a component configured such that the donor access node receives user equipment (UE) handover context information associated with a UE with which the donor access node is in communication via a relay node and such that the donor access node uses the UE handover context information to identify data packets that belong to the UE and are to be forwarded from the donor access node to a target access node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for handing over a user equipment (UE), comprising:
    a donor access node with which the UE is in communication via a relay node receiving UE handover context information; and
    the donor access node using the UE handover context information to identify data packets that belong to the UE and are to be forwarded from the donor access node to a target access node
    wherein, if relay node radio bearer context is not included in the UE handover context information, the donor access node performs a brute-force search inside each Packet Data Convergence Protocol queue of the relay node, based on General Packet Radio Service (GPRS) Tunneling Protocol (GTP)/User Datagram Protocol (UDP)/Internet Protocol (IP) headers or a subset of GTP/UDP/IP headers, to identify the data packets that belong to the UE.

2. The method of claim 1, wherein the UE handover context information is UE context information.

3. The method of claim 1, wherein the UE handover context information includes at least one of:
    a relay node cell global identifier;
    a donor access node identifier;
    security context information; and
    at least one UE bearer tunnel endpoint identifier.

4. The method of claim 3, wherein the UE handover context information further includes relay node radio bearer configuration information.

5. The method of claim 4, wherein the donor access node, based on the relay node radio bearer configuration information, identifies a Packet Data Convergence Protocol queue to which the UE belongs and checks GTP/UDP/IP headers or a subset of GTP/UDP/IP headers of each data packet to identify the data packets that belong to the UE.

6. The method of claim 1, wherein the UE handover context information passes from the relay node to the target access node in a Handover request message.

7. The method of claim 6, wherein the Handover Proxy message is one of:
    a radio resource control (RRC)-based message; and
    an X2-based message.

8. The method of claim 1, wherein the UE handover context information passes from the target access node to the donor access node in a Handover Proxy message.

9. The method of claim 1, wherein the UE handover context information passes from the relay node to the donor access node in a Handover Proxy message.

10. The method of claim 1, further comprising the target access node sending to a serving gateway/packet data network gateway for the UE one of:
    a Proxy Data Tunneling message; and
    a Stop Data Sending message.

11. The method of claim 1, further comprising the donor access node sending to a serving gateway/packet data network gateway for the UE one of:
    a Proxy Data Tunneling message; and
    a Stop Data Sending message.

12. The method of claim 1, further comprising the target access node sending a path switch message to a serving gateway/packet data network gateway and triggering an early path switch to the target access node.

13. The method of claim 1, wherein, if a user plane and a control plane of an S1 interface with a serving gateway/packet data network gateway are terminated at the relay node, a Handover request message is transmitted from the relay node to the target access node via the serving gateway/packet data network gateway.

14. The method of claim 1, wherein, if a user plane of an S1 interface with a serving gateway/packet data network gateway is terminated at the relay node, a Handover request message is transmitted from the relay node to the target access node without passing through the serving gateway/packet data network gateway.

15. The method of claim 1, wherein, if a user plane and a control plane of an S1 interface with a serving gateway/packet data network gateway are terminated at the relay node, the donor access node processes all received data packets by reading a first General Packet Radio Service (GPRS) Tunneling Protocol (GTP) tunneling header for a relay node radio bearer and then reading a second GTP tunneling header afterwards for a UE radio bearer.

16. The method of claim 1, wherein, if a user plane of an S1 interface with a serving gateway/packet data network gateway is terminated at the relay node, the donor access node reads only one GTP header in order to recognize the data packets.

17. The method of claim 1, wherein the donor access node begins forwarding data to the target access node only after receiving a Handover Command acknowledgement message from the relay node.

18. The method of claim 1, wherein the donor access node includes a retention timer that specifies a duration for which forwarded data is retained at the donor access node's buffer.

19. The method of claim 1, wherein, if a user plane of an S1 interface with a serving gateway/packet data network gateway is terminated at the relay node and at the access node, the UE handover context information passes from the relay node to the donor access node in a Handover request message.

20. A donor access node, comprising:
    a component configured such that the donor access node receives user equipment (UE) handover context information associated with a UE with which the donor access node is in communication via a relay node and such that the donor access node uses the UE handover context information to identify data packets that belong to the UE and are to be forwarded from the donor access to a target access node, wherein, if relay node radio bearer context is not included in the UE handover context information, the donor access node performs a brute-force search inside each Packet Data Convergence Protocol queue of the relay node, based on General Packet Radio Service (GPRS) Tunneling Protocol (GTP)/User Datagram Protocol (UDP)/Internet Protocol (IP) headers or a subset of GTP/UDP/IP headers, to identify the data packets that belong to the UE.

21. The method of claim 20, wherein the UE handover context information is UE context information.

22. The donor access node of claim 20, wherein the UE handover context information includes at least one of:
 a relay node cell global identifier;
 a donor access node identifier;
 security context information; and
 at least one UE bearer tunnel endpoint identifier.

23. The donor access node of claim 22, wherein the UE handover context information further includes relay node radio bearer configuration information.

24. The donor access node of claim 23, wherein the donor access node, based on the relay node radio bearer configuration information, identifies a Packet Data Convergence Protocol queue to which the UE belongs and checks GTP/UDP/IP headers or a subset of GTP/UDP/IP headers of each data packet to identify the data packets that belong to the UE.

25. The donor access node of claim 20, wherein the UE handover context information passes from the relay node to the target access node in a Handover request message.

26. The donor access node of claim 20, wherein the UE handover context information passes from the target access node to the donor access node in a Handover Proxy message.

27. The donor access node of claim 20, wherein the UE handover context information passes from the relay node to the donor access node in a Handover Proxy message.

28. The donor access node of claim 27, wherein the Handover Proxy message is one of:
 a radio resource control (RRC)-based message; and
 an X2-based message.

29. The donor access node of claim 20, further comprising the target access node sending to a serving gateway/packet data network gateway for the UE one of:
 a Proxy Data Tunneling message; and
 a Stop Data Sending message.

30. The donor access node of claim 20, further comprising the donor access node sending to a serving gateway/packet data network gateway for the UE one of:
 a Proxy Data Tunneling message; and
 a Stop Data Sending message.

31. The donor access node of claim 20, further comprising the target access node sending a path switch message to a serving gateway/packet data network gateway and triggering an early path switch to the target access node.

32. The donor access node of claim 20, wherein, if a user plane and a control plane of an S1 interface with a serving gateway/packet data network gateway are terminated at the relay node, a Handover request message is transmitted from the relay node to the target access node via the serving gateway/packet data network gateway.

33. The donor access node of claim 20, wherein, if a user plane of an S1 interface with a serving gateway/packet data network gateway is terminated at the relay node, a Handover request message is transmitted from the relay node to the target access node without passing through the serving gateway/packet data network gateway.

34. The donor access node of claim 20, wherein, if a user plane and a control plane of an S1 interface with a serving gateway/packet data network gateway are terminated at the relay node, the donor access node processes all received data packets by reading a first General Packet Radio Service (GPRS) Tunneling Protocol (GTP) tunneling header for a relay node radio bearer and then reading a second GTP tunneling header afterwards for a UE radio bearer.

35. The donor access node of claim 20, wherein, if a user plane of an S1 interface with a serving gateway/packet data network gateway is terminated at the relay node, the donor access node reads only one GTP header in order to recognize the data packets.

36. The donor access node of claim 20, wherein the donor access node begins forwarding data to the target access node only after receiving a Handover Command acknowledgement message from the relay node.

37. The donor access node of claim 20, wherein the donor access node includes a retention timer that specifies a duration for which forwarded data is retained at the donor access node's buffer.

38. The donor access node of claim 20, wherein, if a user plane of an S1 interface with a serving gateway/packet data network gateway is terminated at the relay node and at the access node, the UE handover context information passes from the relay node to the donor access node in a Handover request message.

* * * * *